US009046924B2

(12) United States Patent
Guéziec et al.

(10) Patent No.: US 9,046,924 B2
(45) Date of Patent: *Jun. 2, 2015

(54) GESTURE BASED INTERACTION WITH TRAFFIC DATA

(75) Inventors: André Guéziec, Sunnyvale, CA (US); Briac Blanquart, San Francisco, CA (US)

(73) Assignee: Pelmorex Canada Inc., Oakville, Ontario (CA)

( * ) Notice: Subject to any disclaimer, the term of this patent is extended or adjusted under 35 U.S.C. 154(b) by 615 days.

This patent is subject to a terminal disclaimer.

(21) Appl. No.: 12/881,690

(22) Filed: Sep. 14, 2010

(65) Prior Publication Data

US 2010/0333045 A1    Dec. 30, 2010

Related U.S. Application Data

(63) Continuation-in-part of application No. 12/398,120, filed on Mar. 4, 2009.

(51) Int. Cl.
| | | |
|---|---|---|
| *G06T 15/00* | (2011.01) | |
| *G06F 3/01* | (2006.01) | |
| *G06T 17/05* | (2011.01) | |
| *G01C 21/36* | (2006.01) | |
| *G08G 1/0969* | (2006.01) | |

(52) U.S. Cl.
CPC ............... *G06F 3/016* (2013.01); *G06F 3/017* (2013.01); *G06T 17/05* (2013.01); *G01C 21/3664* (2013.01); *G01C 21/3691* (2013.01); *G01C 21/3697* (2013.01); *G08G 1/0969* (2013.01)

(58) Field of Classification Search
None
See application file for complete search history.

(56) References Cited

U.S. PATENT DOCUMENTS

| | | |
|---|---|---|
| 4,734,863 A | 3/1988 | Honey et al. |
| 4,788,645 A | 11/1988 | Zavoli et al. |
| 4,792,803 A | 12/1988 | Madnick et al. |
| 4,796,191 A | 1/1989 | Honey et al. |
| 4,878,170 A | 10/1989 | Zeevi |
| 4,914,605 A | 4/1990 | Longhmiller, Jr. et al. |
| 4,926,343 A | 5/1990 | Tsuruta et al. |

(Continued)

FOREIGN PATENT DOCUMENTS

| | | |
|---|---|---|
| CO | 6710924 | 7/2013 |
| DE | 19856704 A1 | 6/2001 |

(Continued)

OTHER PUBLICATIONS

WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.

(Continued)

*Primary Examiner* — Daniel Hajnik
(74) *Attorney, Agent, or Firm* — Lewis Roca Rothgerber LLP

(57) ABSTRACT

Gesture based interaction with traffic data is disclosed. A virtual broadcast presentation may be generated based on dynamic information such as traffic information, weather information, or other information that may be featured on a virtual broadcast presentation. A gesture made by a user is detected and processed to determine an input command associated with the detected gesture. The virtual broadcast presentation may be manipulated based on the input command.

19 Claims, 10 Drawing Sheets

(56) References Cited

U.S. PATENT DOCUMENTS

| | | |
|---|---|---|
| 5,068,656 A | 11/1991 | Sutherland |
| 5,095,532 A | 3/1992 | Mardus |
| 5,126,941 A | 6/1992 | Gurmu et al. |
| 5,164,904 A | 11/1992 | Sumner |
| 5,173,691 A | 12/1992 | Sumner |
| 5,182,555 A | 1/1993 | Sumner |
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,147,626 A | 11/2000 | Sakakibara |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,226,591 B1 | 5/2001 | Okumura et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Granuke |
| 6,259,987 B1 | 7/2001 | Ceylan et al. |
| 6,282,486 B1 | 8/2001 | Bates et al. |
| 6,282,496 B1 | 8/2001 | Chowdhary |
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,362,778 B2 | 3/2002 | Neher |
| 6,415,291 B2 | 7/2002 | Bouve et al. |
| 6,424,910 B1 | 7/2002 | Ohler et al. |
| 6,442,615 B1 | 8/2002 | Nordenstam et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |
| 6,504,541 B1 | 1/2003 | Liu et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittelsteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,639,550 B2 | 10/2003 | Knockeart et al. |
| 6,643,581 B2 | 11/2003 | Ooishi |

(56) References Cited

U.S. PATENT DOCUMENTS

| | | | |
|---|---|---|---|
| 6,650,997 | B2 | 11/2003 | Funk |
| 6,654,681 | B1 | 11/2003 | Kiendl et al. |
| 6,675,085 | B2 | 1/2004 | Straub |
| 6,681,176 | B2 | 1/2004 | Funk et al. |
| 6,687,615 | B1 | 2/2004 | Krull et al. |
| 6,700,503 | B2 | 3/2004 | Masar et al. |
| 6,710,774 | B1 | 3/2004 | Kawasaki et al. |
| 6,720,889 | B2 | 4/2004 | Yamaki et al. |
| 6,728,605 | B2 | 4/2004 | Lash et al. |
| 6,728,628 | B2 | 4/2004 | Peterson |
| 6,731,940 | B1 | 5/2004 | Nagendran |
| 6,735,516 | B1 | 5/2004 | Manson |
| 6,754,833 | B1 | 6/2004 | Black et al. |
| 6,785,606 | B2 | 8/2004 | DeKock et al. |
| 6,791,472 | B1 | 9/2004 | Hoffberg |
| 6,807,483 | B1 | 10/2004 | Chao et al. |
| 6,845,316 | B2 | 1/2005 | Yates |
| 6,859,728 | B2 | 2/2005 | Sakamoto et al. |
| 6,862,524 | B1 | 3/2005 | Nagda et al. |
| RE38,724 | E | 4/2005 | Peterson |
| 6,885,937 | B1 | 4/2005 | Sunranyi |
| 6,901,330 | B1 | 5/2005 | Krull et al. |
| 6,914,541 | B1 | 7/2005 | Zierden |
| 6,922,629 | B2 | 7/2005 | Yoshikawa et al. |
| 6,931,309 | B2 | 8/2005 | Phelan et al. |
| 6,952,643 | B2 | 10/2005 | Matsuoka et al. |
| 6,965,665 | B2 | 11/2005 | Fan et al. |
| 6,983,204 | B2 | 1/2006 | Knutson |
| 6,987,964 | B2 | 1/2006 | Obradovich et al. |
| 6,989,765 | B2 | 1/2006 | Gueziec |
| 6,999,873 | B1 | 2/2006 | Krull et al. |
| 7,010,583 | B1 | 3/2006 | Aizono et al. |
| 7,062,378 | B2 | 6/2006 | Krull et al. |
| 7,069,143 | B2 | 6/2006 | Peterson |
| 7,103,854 | B2 | 9/2006 | Fuchs et al. |
| 7,161,497 | B2 | 1/2007 | Gueziec |
| 7,209,828 | B2 | 4/2007 | Katou |
| 7,221,287 | B2 | 5/2007 | Gueziec |
| 7,243,134 | B2 | 7/2007 | Bruner et al. |
| 7,343,242 | B2 | 3/2008 | Breitenberger et al. |
| 7,356,392 | B2 | 4/2008 | Hubbard et al. |
| 7,375,649 | B2 | 5/2008 | Gueziec |
| 7,424,388 | B2 | 9/2008 | Sato |
| 7,433,676 | B2 | 10/2008 | Kobayashi et al. |
| 7,440,842 | B1 | 10/2008 | Vorona |
| 7,486,201 | B2 | 2/2009 | Kelly et al. |
| 7,508,321 | B2 | 3/2009 | Gueziec |
| 7,557,730 | B2 | 7/2009 | Gueziec |
| 7,558,674 | B1 | 7/2009 | Neilley et al. |
| 7,603,138 | B2 | 10/2009 | Zhang et al. |
| 7,610,145 | B2 | 10/2009 | Kantarjiev et al. |
| 7,613,564 | B2 | 11/2009 | Vorona |
| 7,634,352 | B2 | 12/2009 | Soulchin et al. |
| 7,702,452 | B2 | 4/2010 | Kantarjiev et al. |
| 7,792,642 | B1 | 9/2010 | Neiley et al. |
| 7,880,642 | B2 | 2/2011 | Gueziec |
| 7,908,076 | B2 | 3/2011 | Downs et al. |
| 7,912,627 | B2 | 3/2011 | Downs et al. |
| 8,103,443 | B2 | 1/2012 | Kantarjiev et al. |
| 8,358,222 | B2 | 1/2013 | Gueziec |
| 8,428,856 | B2 | 4/2013 | Tischer |
| 8,531,312 | B2 | 9/2013 | Gueziec |
| 8,537,033 | B2 | 9/2013 | Gueziec |
| 8,564,455 | B2 | 10/2013 | Gueziec |
| 8,619,072 | B2 | 12/2013 | Gueziec |
| 8,660,780 | B2 | 2/2014 | Kantarjiev |
| 8,718,910 | B2 | 5/2014 | Gueziec |
| 8,725,396 | B2 | 5/2014 | Gueziec |
| 8,781,718 | B2 | 7/2014 | Margulici |
| 8,786,464 | B2 | 7/2014 | Gueziec |
| 8,825,356 | B2 | 9/2014 | Vorona |
| 8,958,988 | B2 | 2/2015 | Gueziec |
| 8,982,116 | B2 | 3/2015 | Gueziec |
| 2001/0014848 | A1 | 8/2001 | Walgers et al. |
| 2001/0018628 | A1 | 8/2001 | Jenkins et al. |
| 2001/0026276 | A1 | 10/2001 | Sakamoto et al. |
| 2001/0033225 | A1 | 10/2001 | Razavi et al. |
| 2001/0047242 | A1 | 11/2001 | Ohta |
| 2002/0042819 | A1 | 4/2002 | Reichert et al. |
| 2002/0077748 | A1 | 6/2002 | Nakano |
| 2002/0152020 | A1 | 10/2002 | Seibel |
| 2002/0177947 | A1 | 11/2002 | Cayford |
| 2003/0046158 | A1 | 3/2003 | Kratky |
| 2003/0055558 | A1 | 3/2003 | Watanabe et al. |
| 2003/0109985 | A1 | 6/2003 | Kotzin |
| 2003/0135304 | A1 | 7/2003 | Sroub et al. |
| 2003/0151592 | A1* | 8/2003 | Ritter ........................... 345/156 |
| 2003/0182052 | A1 | 9/2003 | DeLorme et al. |
| 2004/0034464 | A1 | 2/2004 | Yoshikawa et al. |
| 2004/0046759 | A1 | 3/2004 | Soulchin et al. |
| 2004/0049424 | A1 | 3/2004 | Murray et al. |
| 2004/0080624 | A1 | 4/2004 | Yuen |
| 2004/0107288 | A1 | 6/2004 | Menninger et al. |
| 2004/0143385 | A1 | 7/2004 | Smyth et al. |
| 2004/0166939 | A1 | 8/2004 | Leifer et al. |
| 2004/0225437 | A1 | 11/2004 | Endo et al. |
| 2004/0249568 | A1 | 12/2004 | Endo et al. |
| 2005/0021225 | A1 | 1/2005 | Kantarjieve et al. |
| 2005/0027436 | A1 | 2/2005 | Yoshikawa et al. |
| 2005/0143902 | A1* | 6/2005 | Soulchin et al. .............. 701/117 |
| 2005/0154505 | A1 | 7/2005 | Nakamura et al. |
| 2005/0212756 | A1* | 9/2005 | Marvit et al. ................. 345/156 |
| 2006/0122846 | A1 | 6/2006 | Burr et al. |
| 2006/0143959 | A1 | 7/2006 | Stehle et al. |
| 2006/0145892 | A1 | 7/2006 | Gueziec |
| 2006/0158330 | A1 | 7/2006 | Gueziec |
| 2006/0238521 | A1 | 10/2006 | Westerman et al. |
| 2006/0238617 | A1 | 10/2006 | Tamir |
| 2006/0284766 | A1 | 12/2006 | Gruchala et al. |
| 2007/0013551 | A1 | 1/2007 | Gueziec |
| 2007/0038362 | A1 | 2/2007 | Gueziec |
| 2007/0060384 | A1 | 3/2007 | Dohta |
| 2007/0066394 | A1 | 3/2007 | Ikeda et al. |
| 2007/0115252 | A1 | 5/2007 | Burgmans |
| 2007/0197217 | A1 | 8/2007 | Sutardja |
| 2007/0208495 | A1 | 9/2007 | Chapman et al. |
| 2007/0208496 | A1 | 9/2007 | Downs et al. |
| 2007/0211026 | A1 | 9/2007 | Ohta |
| 2007/0211027 | A1 | 9/2007 | Ohta |
| 2007/0222750 | A1 | 9/2007 | Ohta |
| 2007/0247291 | A1 | 10/2007 | Masuda et al. |
| 2007/0265766 | A1 | 11/2007 | Jung et al. |
| 2008/0071465 | A1 | 3/2008 | Chapman et al. |
| 2008/0084385 | A1 | 4/2008 | Ranta et al. |
| 2008/0096654 | A1 | 4/2008 | Mondesir et al. |
| 2008/0133120 | A1 | 6/2008 | Romanick |
| 2008/0248848 | A1 | 10/2008 | Rippy et al. |
| 2008/0255754 | A1* | 10/2008 | Pinto ............................ 701/119 |
| 2008/0287189 | A1 | 11/2008 | Rabin |
| 2008/0297488 | A1* | 12/2008 | Operowsky et al. .......... 345/173 |
| 2009/0005965 | A1 | 1/2009 | Forstall et al. |
| 2009/0061971 | A1 | 3/2009 | Weitzner et al. |
| 2009/0066495 | A1 | 3/2009 | Newhouse et al. |
| 2009/0082950 | A1 | 3/2009 | Vorona |
| 2009/0096753 | A1 | 4/2009 | Lim |
| 2009/0112465 | A1* | 4/2009 | Weiss et al. ................... 701/211 |
| 2009/0118017 | A1 | 5/2009 | Perlman et al. |
| 2009/0118996 | A1 | 5/2009 | Kantarjieve et al. |
| 2009/0189979 | A1 | 7/2009 | Smyth |
| 2009/0192702 | A1 | 7/2009 | Bourne |
| 2010/0079306 | A1 | 4/2010 | Liu et al. |
| 2010/0094531 | A1 | 4/2010 | MacLeod |
| 2010/0100307 | A1 | 4/2010 | Kim |
| 2010/0145569 | A1 | 6/2010 | Bourque et al. |
| 2010/0145608 | A1 | 6/2010 | Kurtti et al. |
| 2010/0175006 | A1 | 7/2010 | Li |
| 2010/0198453 | A1 | 8/2010 | Dorogusker et al. |
| 2010/0225643 | A1 | 9/2010 | Gueziec |
| 2010/0305839 | A1 | 12/2010 | Wenzel |
| 2010/0312462 | A1 | 12/2010 | Gueziec |
| 2011/0037619 | A1 | 2/2011 | Ginsberg et al. |
| 2011/0106427 | A1 | 5/2011 | Kim et al. |
| 2011/0304447 | A1 | 12/2011 | Marumoto |
| 2012/0072096 | A1 | 3/2012 | Chapman et al. |

(56) References Cited

U.S. PATENT DOCUMENTS

| | | |
|---|---|---|
| 2012/0123667 A1 | 5/2012 | Gueziec |
| 2012/0150422 A1 | 6/2012 | Kantarjiev et al. |
| 2012/0150425 A1 | 6/2012 | Chapman et al. |
| 2012/0158275 A1 | 6/2012 | Huang et al. |
| 2012/0290202 A1 | 11/2012 | Gueziec |
| 2012/0290204 A1 | 11/2012 | Gueziec |
| 2012/0296559 A1 | 11/2012 | Gueziec |
| 2013/0033385 A1 | 2/2013 | Gueziec |
| 2013/0204514 A1 | 8/2013 | Margulici |
| 2013/0207817 A1 | 8/2013 | Gueziec |
| 2013/0211701 A1 | 8/2013 | Baker et al. |
| 2014/0088871 A1 | 3/2014 | Gueziec |
| 2014/0091950 A1 | 4/2014 | Gueziec |
| 2014/0107923 A1 | 4/2014 | Gueziec |
| 2014/0129124 A1 | 5/2014 | Margulici |
| 2014/0129142 A1 | 5/2014 | Kantarjiev |
| 2014/0139520 A1 | 5/2014 | Gueziec |
| 2014/0236464 A1 | 8/2014 | Gueziec |
| 2014/0249734 A1 | 9/2014 | Gueziec |
| 2014/0316688 A1 | 10/2014 | Margulici |
| 2014/0320315 A1 | 10/2014 | Gueziec |

FOREIGN PATENT DOCUMENTS

| | | |
|---|---|---|
| EP | 0 749 103 | 12/1996 |
| EP | 0 987 665 A2 | 3/2000 |
| EP | 1 006 367 | 6/2000 |
| EP | 2 178 061 | 4/2010 |
| EP | 2 635 989 | 9/2011 |
| EP | 2 616 910 | 7/2013 |
| EP | 2 638 493 | 9/2013 |
| EP | 2 710 571 | 3/2014 |
| EP | 2 820 631 | 1/2015 |
| GB | 2 400 293 | 10/2004 |
| JP | 05-313578 A | 11/1993 |
| JP | 08-77485 | 3/1996 |
| JP | 10-261188 A | 9/1998 |
| JP | 10-281782 A | 10/1998 |
| JP | 10-293533 A | 11/1998 |
| JP | 2000-055675 A | 2/2000 |
| JP | 2000-113387 A | 4/2000 |
| JP | 2001-330451 | 11/2001 |
| WO | WO 96/36929 | 11/1996 |
| WO | WO 98/23018 | 5/1998 |
| WO | WO 00/50917 | 8/2000 |
| WO | 0188480 A1 | 11/2001 |
| WO | WO 02/077921 | 10/2002 |
| WO | 03014671 A1 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |
| WO | WO 2012/065188 | 5/2012 |
| WO | WO 2012/159803 | 11/2012 |
| WO | WO 2013/113029 | 8/2013 |

OTHER PUBLICATIONS

Truett, R., "Car Navigation System May Live on After Test," The Orlando Sentinel, Feb. 17, 1993, p. 3 pages.

U.S. Dept. of Transportation, Closing the Data Gap: Guidelines for Quality Advanced Traveler Information System (ATIS) Data, Version 1.0, Sep. 2000, 41 pages.

Watanabe et al, "Development of a Three-dimensional Bird's-Eye View Map Drawing Technique for Car Navigation Systems," Society of Automotive Engineers, Inc., 1996, pp. 11-18.

Wischhof, L. et al., "SOTIS—A Self-Organizing Traffic Information System," Proceedings of the 57th IEEE Vehicular Technology Conference (VTC—'03), 2003, pp. 2442-2446, New York, NY, USA.

Yokouchi, K., "Car-Navigation Systems," Mitsubishi Electr. Adv. Technical Reports, 2000, vol. 91, pp. 10-14, Japan.

You, J. et al., "Development and Evaluation of a Hybrid Travel Time Forecasting Model," Transportation Research Part C 8, 2000, pp. 231-256, Pergamon Press Ltd., Elsevier Science Ltd., U.K.

Zhu, C. et al., "3D Terrain Visualization for Web GIS," Center for Advanced Media Technology, Nanyang Technological University, Singapore, 2003, 8 pages.

Audi-V150 Manual, Oct. 2001, 152 pages, Japan.

Birdview Navigation System by Nissan Motor Corp, 240 Landmarks of Japanese Automotive Technology, 1995, 2 pages, Society of Automotive Engineers of Japan, Inc., Japan.

Carin Navigation System Manual and Service Manual for Model Carin 22SY520, 76 pages, Philips Car Systems, The Netherlands.

Dancer, F. et al, "Vehicle Navigation Systems: Is America Ready?," Navigation and Intelligent Transportation Systems, Automotive Electronics Series, Society of Automotive Engineers, 1998, pp. Cover page, Table of Contents, pp. 3-8.

Endo et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.

Panasonic Portable Navigation System User Manual for Products KX-GT30, KX-GT30X, and KX-GT30Z, Cover page, pp. 1-5, 132-147, End pages, Matsushita Denki Sangyo K.K., Fukuoka City, Japan [Date Unknown].

Inman, V.W. et al., "TravTek Global Evaluation and Executive Summary," Publication No. FHWA-RD-96-031, Mar. 1996, 104 pages, U.S. Department of Transportation, McLean, VA, USA.

Inman, V.W. et al., "TravTek Evaluation Rental and Local User Study," Publication No. FHWA-RD-96-028, Mar. 1996, 110 pages, U.S. Department of Transportation, McLean, VA, USA.

Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.

Blumentritt, K. et al., "TravTek System Architecture Evaluation," Publication No. FHWA-RD-96-141, Jul. 1995, 504 pages, U.S. Department of Transportation, McLean, VA, USA.

Zhao, Y. "Vehicle Location and Navigation Systems," 1997, 370 pages, Arthech House, Inc., Norwood, MA, USA.

"TravTek Information and Services Center Policy/Procedures Manual," Feb. 1992, 133 pages, U.S. Department of Transportation, McLean, VA, USA.

N'Fit Xanavi, unknown date, 94 pages, Japan.

XM Radio Introduces Satellite Update Service for Vehicle Navigation, Apr. 8, 2004, 2 pages.

Slothower, D., "Sketches & Applications," SIGGRAPH 2001, pp. 138-144, Stanford University.

Karbassi, A. et al., "Vehicle Route Prediction and Time of Arrival Estimation Techniques for Improved Transportation System Management," in Proceedings of the Intelligent Vehicles Symposium, 2003, pp. 511-516, IEEE, New York, NY, USA.

Koller, D. et al., "Virtual GIS: A Real-Time 3D Geographic Information System," Proceedings of the 6th IEEE Visualization Conference (VISUALIZATION '95) 1995, pp. 94-100, IEEE, New York, NY, USA.

Acura Debuts AcuraLink™ Satellite-Linked Communication System with Industry's First Standard Real Time Traffic Feature at New York International Auto Show, 2004, 4 pages.

Burgett, A. L.,"Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.

de Cambray, B. "Three-Dimensional (3D) Modelling in a Geographical Database," Auto-Carto'11, Eleventh International Conference on Computer Assisted Cartography, Oct. 30, 1993-Nov. 1, 1993, pp. 338-347, Minneapolis, USA.

Campbell, J. L., "Development of Human Factors Design Guidelines for Advanced Traveler Information Systems (ATIS)", Proceedings Vehicle Navigation and Information Systems Conference, 1995, pp. 161-164, IEEE, New York, NY, USA.

(56) References Cited

OTHER PUBLICATIONS

Campbell, J. L., "Development of Human Factors Design Guidelines for Advanced Travel Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.

Cathey, F.W. et al., "A Prescription for Transit Arrival/Departure Prediction Using Automatic Vehicle Location Data," Transportation Research Part C 11, 2003, pp. 241-264, Pergamon Press Ltd., Elsevier Ltd., U.K.

Chien, S. I. et al., "Predicting Travel Times for the South Jersey Real-Time Motorist Information System," Transportation Research Record 1855, Paper No. 03-2750, Revised Oct. 2001, pp. 32-40.

Chira-Chavala, T. et al. "Feasibility Study of Advanced Technology HOV Systems," vol. 3: Benefit Implications of Alternative Policies for Including HOV lanes in Route Guidance Networks, Dec. 1992, 84 pages, UCB-ITS-PRR-92-5 PATH Research Report, Inst. of Transportation Studies, Univ. of Calif., Berkeley, USA.

Clark. E.L., Development of Human Factors Guidelines for Advanced Traveler Information Systems (ATIS) and Commercial Vehicle Operations (CVO): Comparable Systems Analysis, Dec. 1996, 199 pages.

Davies, P. et al., "Assessment of Advanced Technologies for Relieving Urban Traffic Congestion," National Cooperative Highway Research Program Report 340, Dec. 1991, 106 pages.

Dillenburg, J.F. et al., "The Intelligent Travel Assistant," IEEE 5th International Conference on Intelligent Transportation Systems, Sep. 3-6, 2002, pp. 691-696, Singapore.

Dingus, T.A. et al., "Human Factors Engineering the TravTek Driver Interface," Vehicle Navigation & Information Systems Conference Proceedings (VNIS'91), P-253, Part 2, Oct. 1991, pp. 749-755, Soc. of Automotive Engineers, Inc., Warrendale, PA, USA.

Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.

GM Exhibits Prototype of Travtek Test Vehicle, Inside IVHS, Oct. 28, 1991, V. 1, No. 21, 2 pages.

Golisch, F., Navigation and Telematics in Japan, International Symposium on Car Navigation Systems, May 21, 1997, 20 pages, held in Barcelona, Spain.

Gueziec, A., "Architecture of a System for Producing Animated Traffic Reports," Mar. 30, 2001, 42 pages.

Handley, S. et al., "Learning to Predict the Duration of an Automobile Trip," Proceedings of the Fourth International Conference on Knowledge Discovery and Data Mining, 1998, 5 pages, AAAI Press, New York, NY, USA.

Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.

Hoffmann, G. et al., Travel Times as a Basic Part of the LISB Guidance Strategy, Third International Conference on Road Traffic Control, May 1-3, 1990, pp. 6-10, London, U.K.

Hofmann, T. "2005 Acura RL Prototype Preview," Auto123.com, 4 pages.

Hu, Z. et al., "Real-time Data Fusion on Tracking Camera Pose for Direct Visual Guidance," IEEE Vehicles Symposium, Jun. 14-17, 2004, pp. 842-847, held in Parma, Italy.

Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.

Jiang, G., "Travel-Time Prediction for Urban Arterial Road: A Case on China," Proceedings Intelligent Transportation Systems, Oct. 12-15, 2003, pp. 255-260, IEEE, New York, NY, USA.

Kopitz et al., Table of Contents, Chapter 6, Traffic Information Services, and Chapter 7, Intelligent Transport Systems and RDS-TMC in RDS: The Radio Data System, 1992, Cover p. XV, pp. 107-167, Back Cover page, Artech House Publishers, Boston, USA and London, Great Britain.

Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.

Ladner, R. et al., "3D Mapping of an Interactive Synthetic Environment," Computing Practices, Mar. 2000, pp. 33-39, IEEE, New York, NY, USA.

Lowenau, J. et al., "Final Map Actualisation Requirements," Version 1.1, ActMAP Consortium, Sep. 30, 2004, 111 pages.

Meridian Series of GPS Receivers User Manual, Magellan, 2002, 106 pages, Thales Navigation, Inc., San Dimas, CA, USA.

Ness, M. et al, "A Prototype Low Cost In-Vehicle Navigation System," IEEE—IEE Vehicle Navigation & Information Systems Conference (VNIS), 1993, pp. 56-59, New York, NY, USA.

Noonan J. et al., "Intelligent Transportation Systems Field Operational Test Cross-Cutting Study Advanced Traveler Information Systems," Sep. 1998, 27 pages, U.S. Department of Transportation, McLean, VA, USA.

Odagaki et al., Automobile Navigation System with Multi-Source Guide Information, International Congress & Exposition, Feb. 24-28, 1992, pp. 97-105, SAE Inernational, Warrendale, PA, USA.

Raper, J.F. et al., "Three-Dimensional GIS," in Geographical Information Systems: Principles and Applications, 1991, vol. 1, Chapter 20, 21 pages.

Reference Manual for the Magellan RoadMate 500/700, 2003, 65 pages, Thales Navigation, Inc., San Dimas, CA, USA.

Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.

Rillings, J. H., et al., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.

Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.

Schofer, J. L., "Behavioral Issues in the Design and Evaluation of Advanced Traveler Information Systems," Transportation Research Part C 1, 1993, pp. 107-117, Pergamon Press Ltd., Elsevier Science Ltd.

Schulz, W., "Traffic Management Improvement by Integrating Modern Communication Systems," IEEE Communications Magazine, Oct. 1996, pp. 56-60, New York, NY, USA.

Shepherd, I.D.H. et al., "Information Integration and GIS," in Geographical Information Systems: Principles and Applications, 1991, vol. 1, pp. Cover p. 337-360, end page.

Sirius Satellite Radio: Traffic Development Kit Start Up Guide, Sep. 27, 2005, Version 00.00.01, NY, New York, 14 pages.

Sumner, R. "Data Fusion in Pathfinder and TravTek," Part 1, Vehicle Navigation & Information Systems Conference Proceedings (VNIS '91), Oct. 1991, Cover & Title page, pp. 71-75.

Tamura et al., "Toward Realization of VICS—Vehicle Information and Communications System," IEEE—IEE Vehicle Navigation & Information Systems Conference (VNIS 93),1993, pp. 72-77, held in Ottawa, Canada.

Taylor, K.B., "TravTek—Information and Services Center," Vehicle Navigation & Information System Conference Proceedings (VNIS '91), P-253, Part 2, Oct. 1991, pp. 763-774, Soc. of Automotive Engineers, Inc., Warrendale, PA, USA.

Thompson S.M. et al., "Exploiting Telecommunications to Delivery Real Time Transport Information," Road Transport Information and Control, Conf. Publication No. 454, Apr. 21-23, 1998, pp. 59-63, IEE, U.K.

"The Challenge of VICS: The Dialog Between the Car and Road has Begun," Oct. 1, 1996, pp. 19-63, The Road Traffic Information Communication System Centre (VICS Centre), Tokyo, Japan.

Tonjes, R., "3d Reconstruction of Objects from Ariel Images Using a GIS," presented at ISPRS Workshops on "Theoretical and Practical

(56) References Cited

OTHER PUBLICATIONS

Aspects of Surface Reconstructions and 3-D Object Extraction" Sep. 9-11, 1997, 8 pages, held in Haifa, Israel.

Nissan Automobile Navigation System User Manual, [date unknown], 163 pages.

Levinson, D. et al., "Assessing the Benefits and Costs of Intelligent Transportation Systems: The Value of Advanced Traveler Information Systems," Publication UCB-ITS-PRR-99-20, California Path Program, Jul. 1999, Institute of Transportation Studies, University of California, Berkeley, CA, USA.

Garmin's Preliminary Invalidity Contentions and Certificate of Service filed May 16, 2011 in *Triangle Software, LLC.* v. *Garmin International, Inc. et al.*, Case No. 1: 10-cv-1457-CMH-TCB in the United States District Court for the Eastern District of Virginia, Alexandria Division, 46 pages.

Attachment A of Garmin's Preliminary Invalidity Contentions and Certificate of Service filed May 16, 2011 in *Triangle Software, LLC.* v. *Garmin International, Inc. et al.*, Case No. 1: 10-cv-1457-CMH-TCB in the United States District Court for the Eastern District of Virginia, Alexandria Division, 6 pages.

Attachment B of Garmin's Preliminary Invalidity Contentions and Certificate of Service filed May 16, 2011 in *Triangle Software, LLC.* v. *Garmin International, Inc. et al.*, Case No. 1: 10-cv-1457-CMH-TCB in the United States District Court for the Eastern District of Virginia, Alexandria Division, 618 pages.

Preliminary Invalidity Contentions of Defendant TomTom, Inc., Certificate of Service and Exhibit A filed May 16, 2011 in *Triangle Software, LLC.* v. *Garmin International, Inc. et al.*, Case No. 1: 10-cv-1457-CMH-TCB in the United States District Court for the Eastern District of Virginia, Alexandria Division, 354 pages.

Garmin International, Inc. and Garmin USA, Inc.'s Answer and Counterclaim to Triangle Software, LLC's Supplemental Complaint filed Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 36 pages.

Initial Expert Report of William R. Michalson, Ph. D. dated Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 198 pages.

Supplemental Expert Report of William R. Michalson, Ph. D. Regarding Invalidity of the Patents—in-Suit dated Jul. 5, 2011 in *Triangle Software, LLC* v. *Garmin International Inc. et al.*, in the United States District Court for the Eastern District of Virginia, Alexandria Division, Case No. 1:10-cv-1457-CMH-TCB, 23 pages.

Initial Expert Report of Roy Summer dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 289 pages.

Expert Report of Dr. Michael Goodchild Concerning the Validity of U.S. 5,938,720 dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 16 pages.

Balke, K.N. et al., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.

Fawcett, J. et. al, Adaptive Routing for Road Traffic, IEEE Computer Graphics and Applications, May/Jun. 2000, pp. 46-53, IEEE, New York, NY, USA.

Rillings, J.H. et al., "Advanced Driver Information Systems," IEEE Transactions on Vehicular Technology, Feb. 1991, vol. 40, No. 1, pp. 31-40, IEEE, New York, NY, USA.

Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.

Answer, Affirmative Defenses, and Counterclaims by Defendant Westwood One, Inc., to Plaintiff Triangle Software, LLC's Complaint for Patent Infringement.

Answer and Counterclaims of TomTom, Inc. to Plaintiff Triangle Software, LLC's Complaint for Patent Infringement.

Amended Answer and Counterclaims of TomTom, Inc. to Plaintiff Triangle Software, LLC's Complaint for Patent Infringement.

Brooks, et al., "Turn-by-Turn Displays versus Electronic Maps: An On-the-Road Comparision of Driver Glance Behavior," Technical Report, The University of Michigan, Transportation Research Institute (UMTRI), Jan. 1999.

Declaration Under 37 C.F.R. 1.131 and Source Code from U.S. Appl. No. 10/897,550.

Fleischman, R.N., "Research and Evaluation Plans for the TravTek IVHS Operational Field Test," Vehicle Navigation & Information Systems Conference Proceedings (VNIS'91), P-253, Part 2, Oct. 1991, pp. 827-837, Soc. of Automotive Engineers, Inc., Warrendale, PA, USA.

Garmin International, Inc.'s Answer and Counterclaims to Triangle Software, LLC's Complaint.

Garmin International, Inc.'s Amended Answer and Counterclaims to Triangle Software, LLC's Complaint.

Goldberg et al., "Computing the Shortest Path: A Search Meets Graph Theory," Proc. of the 16th Annual ACM-SIAM Sym. on Discrete Algorithms, Jan. 23-25, 2005. Vancouver, BC.

Goldberg et al., "Computing the Shortest Path: A Search Meets Graph Theory," Microsoft Research, Technical Report MSR-TR-2004 Mar. 24, 2003.

Gueziec, Andre, "3D Traffic Visualization in Real Time," ACM Siggraph Technical Sketches, Conference Abstracts and Applications, p. 144, Los Angeles, CA, Aug. 2001.

Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.

Nintendo Wii Operations Manual Systems Setup. 2009.

Rockwell, Mark, "Telematics Speed Zone Ahead," Wireless Week, Jun. 15, 2004, Reed Business Information, http://www.wirelessweek.com.

Taylor, K.B., "TravTek—Information and Services Center," Vehicle Navigation & Information System Conference Proceedings (VNIS'91), P-253, Part 2, Oct. 1991, pp. 763-774, Soc. of Automotive Engineers, Inc., Warrendale, PA, USA.

User Guide of Tom Tom ONE; 2006.

Volkswagon Group of America, Inc.'s Answer and Counterclaim.

Watanabe, M. et al., "Development and Evaluation of a Car Navigation System Providing a Bird's-Eye View Map Display," Technical Paper No. 961007, Feb. 1, 1996, pp. 11-18, SAE International.

Yim et al., TravInfo. Field Operationall Test Evaluation "Evaluation of TravInfo Field Operation Test" Apr. 25, 2000.

Yim et al., "TravInfo Field Operational Test Evaluation: Information Service Providers Customer Survey" (2000).

PCT Application No. PCT/US2004/23884, Search Report and Written Opinion mailed Jun. 17, 2005.

PCT Application No. PCT/US2011/48680, Search Report and Written Opinion mailed Feb. 7, 2012.

PCT Application No. PCT/US2011/51647, Search Report and Written Opinion mailed Feb. 2, 2012.

PCT Application No. PCT/US2011/60663, Search Report and Written Opinion mailed May 31, 2012.

PCT Application No. PCT/US2012/38702, Search Report and Written Opinion mailed Aug. 24, 2012.

EP Patent Application No. 11 825 897.9, Communication mailed May 3, 2013.

U.S. Appl. No. 10/379,967, Final Office Action mailed May 11, 2005.
U.S. Appl. No. 10/379,967, Office Action mailed Sep. 20, 2004.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 11/509,954, Office Action mailed Nov. 23, 2007.
U.S. Appl. No. 11/751,628, Office Action mailed Jan. 29, 2009.
U.S. Appl. No. 12/283,748, Office Action mailed Aug. 20, 2009.

(56) References Cited

OTHER PUBLICATIONS

U.S. Appl. No. 12/283,748, Office Action mailed Mar. 11, 2009.
U.S. Appl. No. 12/398,120, Final Office Action mailed Mar. 26, 2013.
U.S. Appl. No. 12/398,120, Office Action mailed Nov. 14, 2012.
U.S. Appl. No. 12/398,120, Final Office Action mailed Apr. 12, 2012.
U.S. Appl. No. 12/398,120, Office Action mailed Nov. 15, 2011.
U.S. Appl. No. 12/763,199, Final Office Action mailed Nov. 1, 2010.
U.S. Appl. No. 12/763,199, Office Action mailed Aug. 5, 2010.
U.S. Appl. No. 12/860,700, Office Action mailed Feb. 26, 2013.
U.S. Appl. No. 12/967,045, Final Office Action mailed Jun. 27, 2012.
U.S. Appl. No. 12/967,045, Office Action mailed Jul. 18, 2011.
U.S. Appl. No. 13/296,108, Office Action mailed May 9, 2013.
U.S. Appl. No. 13/316,250, Office Action mailed Jan. 18, 2013.
U.S. Appl. No. 13/475,502, Office Action mailed Apr. 22, 2013.
U.S. Appl. No. 13/561,269, Office Action mailed Dec. 13, 2012.
U.S. Appl. No. 13/561,327, Office Action mailed Oct. 26, 2012.
U.S. Appl. No. 12/860,700, Final Office Action mailed Jun. 26, 2013.
U.S. Appl. No. 13/316,250, Final Office Action mailed Jun. 24, 2013.
U.S. Appl. No. 13/475,502, Final Office Action mailed Sep. 10, 2013.
U.S. Appl. No. 13/747,454, Office Action mailed Jun. 17, 2013.
U.S. Appl. No. 13/752,351, Office Action mailed Jul. 22, 2013.
PCT Application No. PCT/US2013/23505, Search Report and Written Opinion mailed May 10, 2013.
U.S. Appl. No. 13/296,108, Final Office Action mailed Oct. 25, 2013.
U.S. Appl. No. 12/860,700, Final Office Action mailed Jul. 22, 2014.
U.S. Appl. No. 12/860,700, Office Action mailed Apr. 3, 2014.
Yang, Qi; "A Simulation Laboratory for Evaluation of Dynamic Traffic Management Systems", Massachusetts Institute of Technology, Jun. 1997.
U.S. Appl. No. 14/100,985, Office Action mailed Sep. 23, 2014.
Huang, Tsan-Huang, Chen, Wu-Cheng; "Experimental Analysis and Modeling of Route Choice with the Revealed and Stated Preference Data" Journal of the Eastern Asia Society for Transportation Studies, vol. 3, No. 6, Sep. 1999—Traffic Flow and Assignment.
U.S. Appl. No. 14/323,352, Office Action mailed Nov. 26, 2014.
U.S. Appl. No. 14/058,195, Office Action mailed Nov. 12, 2014.
U.S. Appl. No. 14/100,985, Final Office Action mailed Mar. 25, 2015.
U.S. Appl. No. 14/327,468, Office Action mailed Mar. 12, 2015.
U.S. Appl. No. 14/323,352, Final Office Action mailed Apr. 3, 2015.
U.S. Appl. No. 14/058,195, Final Office Action mailed Apr. 8, 2015.

\* cited by examiner

GESTURE BASED INTERACTION WITH TRAFFIC DATA

CROSS-REFERENCE TO RELATED APPLICATIONS

This application is a continuation-in-part and claims the priority benefit of U.S. patent application Ser. No. 12/398,120, now U.S. Pat. No. 8,619,072, filed Mar. 4, 2009 and entitled "Controlling a Three-Dimensional Virtual Broadcast." The disclosure of the aforementioned application is incorporated herein by reference.

FIELD OF THE INVENTION

The present invention generally relates to broadcast presentation technology. More particularly, the present invention concerns the use of a gesture to interact with traffic information and other related data presented during a virtual broadcast presentation.

BACKGROUND OF THE INVENTION

Existing broadcast presentations generally include a variety of maps, images, and animations that display current or forecasted conditions for reference by a presenter (i.e., news reporter) during a broadcast presentation such as a traffic or weather report. The broadcast presentation is often produced prior to a scheduled broadcast for presentation by a traffic or weather reporter in a fixed arrangement (much like a slide show) with a prerehearsed script. Although the presenter has the ability to control the speed and manner in which the broadcast presentation is presented to a viewing audience, the content in the maps and images remains fixed. That is, the content presented during the broadcast presentation is not in real-time and is outdated. The reporting of outdated information (e.g., traffic or weather information) may have a drastic effect on a viewing audience who may rely on the reported information to make decisions about such things as travel or logistics.

Another shortcoming of existing broadcast technology is the lack of interaction with the content of the virtual broadcast presentation. Since the presentation contains pre-determined content, a presenter is unable to directly interact with or manipulate the maps and images of the presentation. The presenter cannot, for example, retrieve real-time conditions or other information associated with the maps or images of the presentation.

As such, there is a need in the art for gesture based interaction with traffic data and other related data.

SUMMARY OF THE INVENTION

Embodiments of the present invention allow a presenter to interact with traffic data and other related data in real-time presented on a display screen or other suitable display using one or more gestures.

In a first claimed embodiment, a method for gesture based interaction with traffic data is claimed. Through the method, a virtual broadcast presentation is generated based on traffic data received from one or more information sources. A gesture made by a user interacting with the virtual broadcast presentation is processed, the gesture being associated with an input command for manipulating the virtual broadcast presentation. The input command associated with a detected gesture is determined and the virtual broadcast presentation is manipulated based on the input command.

In a second claimed embodiment, a system for gesture based interaction with traffic data is claimed. The system includes at least a communications module, a presentation rendering module, and a gesture recognition module, each module stored in memory and executable by a processor. Execution of the communications module by the processor detects a gesture made by a user interacting with a virtual broadcast presentation. The gesture is associated with an input command for manipulating the virtual broadcast presentation. Execution of the gesture recognition module processes, recognizes, and/or interprets a gesture and determines whether the gesture corresponds to a known input command. Execution of the presentation rendering module by the processor generates the virtual broadcast presentation based on traffic data received from one or more information sources, and manipulates the virtual broadcast presentation based on the input command.

In a third claimed embodiment, a non-transitory computer-readable storage medium is claimed. The storage medium includes a computer program that is executable by a processor to perform a method for gesture based interaction with traffic data. A gesture made by a user interacting with the virtual broadcast presentation is processed, the gesture being associated with an input command for manipulating the virtual broadcast presentation. The input command associated with a detected gesture is then determined and the virtual broadcast presentation is manipulated based on the input command.

DETAILED DESCRIPTION

The present invention provides for the use of a gesture to interact with traffic information and other related data during a virtual broadcast presentation. The virtual broadcast presentation may include maps, images, graphics, animations, multimedia overlays, and the like, that are rendered in a two-dimensional or three-dimensional manner on a display screen such as a liquid crystal display (LCD) screen or computer monitor screen. A presenter may refer to the virtual broadcast presentation in real-time and may manipulate a view of the presentation using a gesture. The presenter may also use a gesture to select an interactive element included in the presentation.

Figure 1:
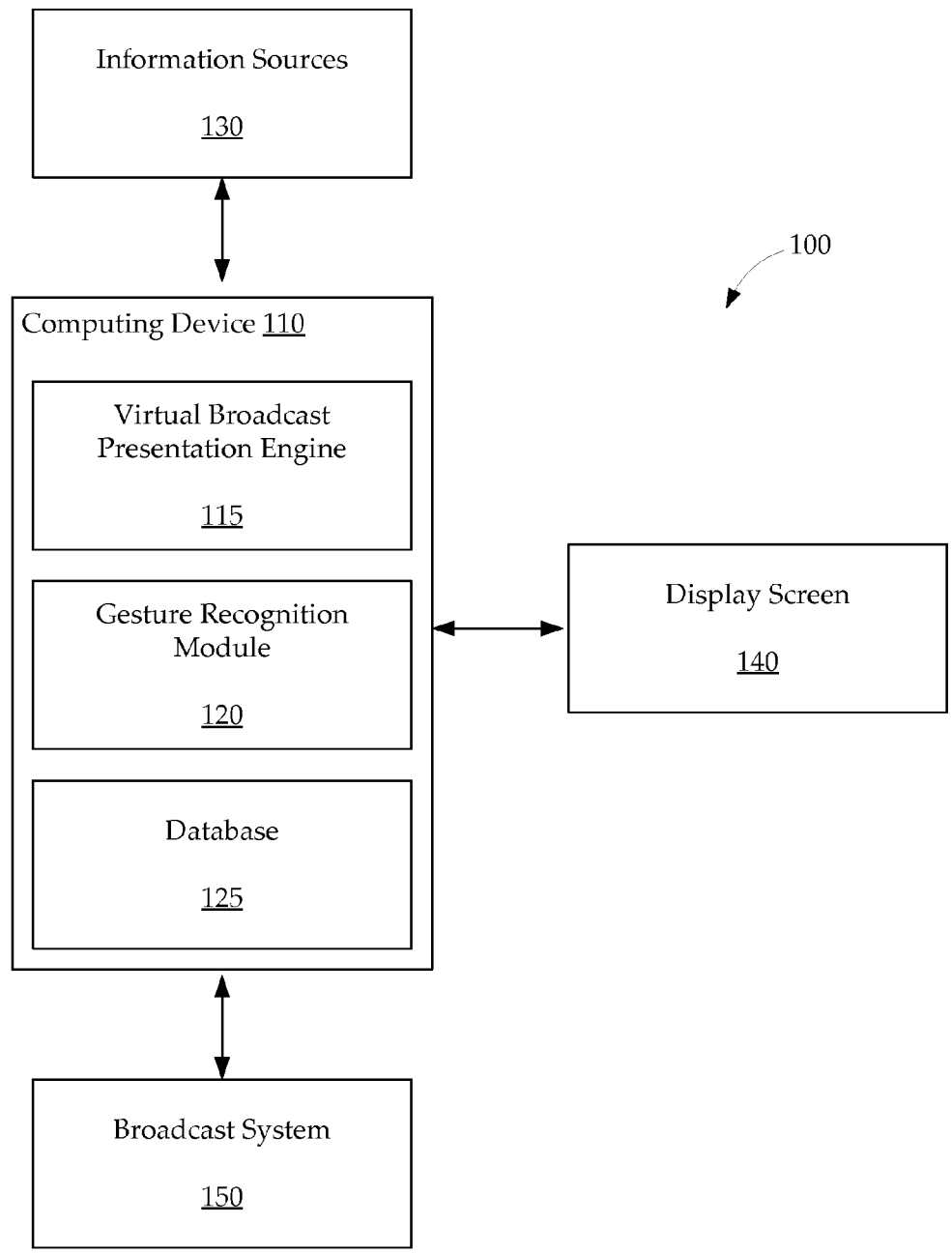
FIG. 1 illustrates a block diagram of an environment for the broadcast of a virtual broadcast presentation that a user may interact with and reference in real-time.

FIG. 1 illustrates a block diagram of an environment for the broadcast of a virtual broadcast presentation that a user may interact with and reference in real-time. The environment 100 of FIG. 1 includes a computing device 110 having a virtual broadcast presentation engine 115, a gesture recognition module 120, and a database 125. The computing device 110 of FIG. 1 is communicatively coupled to information sources 130, a display screen 140, and a broadcast system 150. While FIG. 1 illustrates one particular environment 100 including certain elements for the broadcast of a virtual presentation, alternative embodiments may be implemented that utilize differing elements than those disclosed in FIG. 1 (or combinations of the same), but that otherwise fall within the scope and spirit of the present invention.

The computing device 110 and the virtual broadcast presentation engine 115 may generate a composite presentation that includes a virtual broadcast presentation. The virtual broadcast presentation may be two-dimensional or three-dimensional. The composite presentation may be generated using information obtained in real-time (or near real-time) from the information sources 130 as described in further detail below. The virtual broadcast presentation engine 115, in particular, is discussed with respect to FIG. 2. The computing device 110 may include various components such as one or more of communications interfaces, a processor, memory, storage, and any number of buses providing communication therebetween (not shown). The processor may execute instructions implemented through computing modules or engines while the memory and storage may both permanently or temporarily store data including the aforementioned modules and engines.

The computing device 110 of FIG. 1 includes a gesture recognition module 120 which is stored in the memory of computing device 110 and is executable by a processor to process, recognize, and/or interpret a gesture. The gesture recognition module 120 may employ any technique known in the art for processing and detecting a gesture such as computer vision or image processing. In one embodiment, the gesture recognition module 120 may identify a received gesture by comparing the gesture to a plurality of previously identified gestures stored in database 125.

A gesture may be static or dynamic and may include any form of movement, motion, or other non-verbal communication or form of expression made by the body of a user. A gesture, for example, may include a static pose or configuration, or may include movement or motion of the limbs (i.e., hands, legs) or face (i.e., eyes, lips) of the user. In one embodiment, each detected gesture may be associated with an input command for directing the computing device 110 to perform a particular action or task such as manipulating a view of the virtual broadcast presentation. For example, detection of vertical downward movement of a pointed index finger may correspond to an input command for scrolling down a virtual broadcast presentation. Gesture recognition module 120 may process the detected gesture and determine whether the gesture corresponds to a known input command.

In another embodiment, a gesture may be associated with a voice command (e.g., a spoken word or phrase). The computing device 110 may include a microphone for voice detection and a voice recognition module for processing the detected voice command (not shown). The gesture recognition module 120 may match a detected gesture to a detected voice command and determine whether the gesture and voice command are associated with a particular input command. The computing device 110 may perform a specific action or task based on the detection of a gesture associated with a particular voice command and input command.

To capture or detect a gesture or any other movement or pose made by a user, the computing device 110 may be communicatively coupled to or include one or more cameras known in the art such as depth-aware cameras, stereo cameras, single cameras or any other suitable cameras. The computing device 110 may also include one or more sensors known in the art for gesture detection or motion sensing such as an optical sensor, (e.g. infrared, laser), an image sensor, an accelerometer, a gyroscopic component, a magnetometer, and the like. Processing of a detected gesture or image, for example, may include enhancement of the image and extraction and grouping of image features. The sensors may take various measurements and a gesture may be identified using pattern recognition, neural network algorithms, or any other technique known in the art.

The computing device 110 may also include a database 125 for storing a plurality of acceptable gestures each associated with a particular input command and/or voice command. The database 125 may be integrated with or separate from the computing device 110. In one embodiment, a user may customize or update the database 125 by adding or removing acceptable gestures, voice commands, and input commands. The detection of a specific gesture and/or voice command associated with a particular input command causes the computing device (i.e., virtual broadcast presentation engine 115) to perform some action such as manipulating the virtual broadcast presentation based on the input command.

The information sources 130 may be provided by various organizations and in a variety of forms. The information sources 130 may include data sources related to traffic data such as traffic flow and as described in U.S. patent application Ser. No. 11/302,418, now U.S. Pat. No. 7,221,287, or weather data such as forecasts. The information sources 130 may also include data sources related to newsworthy events or incidents such as school closings, election results, and other information that may be featured in a virtual broadcast presentation. The information sources 130 may require subscription or authentication for access and may be accessible via Telnet, FTP, or web services protocols. The information may be received from the information sources 130 in real-time or near real-time to allow for generation of an equally real-time or near real-time presentation. That presentation may, in turn, be manipulated in real-time.

In an embodiment of the present invention utilizing traffic data specific to the San Francisco Bay area, the information sources 130 may include one or more of the 511.org system (a collaboration of public agencies including the California Highway Patrol, Metropolitan Transportation Commission, and CALTRANS), the California Highway Patrol (CHP) World Wide Web server, the PeMS system at the University of California at Berkeley, various public event listings, or a publicly or privately accessible user input mechanism. For weather data, the information sources 130 may include the National Weather Service among other weather information sources. Other data sources or alternative types of data sources (e.g., non-traffic and non-weather related sources) may be incorporated and utilized in various embodiments of the present invention.

The display screen 140 may be any media display screen known in the art such as a LCD screen, television screen, computer monitor screen, projection screen, multi-touch touch screen, or any other suitable display. A presenter may interact with display screen 140 using a gesture.

The broadcast system 150 disseminates the composite presentation to viewers. Dissemination may occur via radio waves such as UHF or VHF, cable, satellite, or the World Wide Web. Hardware and software necessary to effectuate a broadcast may be included in the broadcast system 150 and are generally known to those skilled in the broadcasting art. Broadcast images are also commonly disseminated to the public via cable transmission, Internet Protocol television (IPTV) transmission, and digital broadcasts such as using Digital Video Broadcasting (DVB) and the like.

Figure 2:
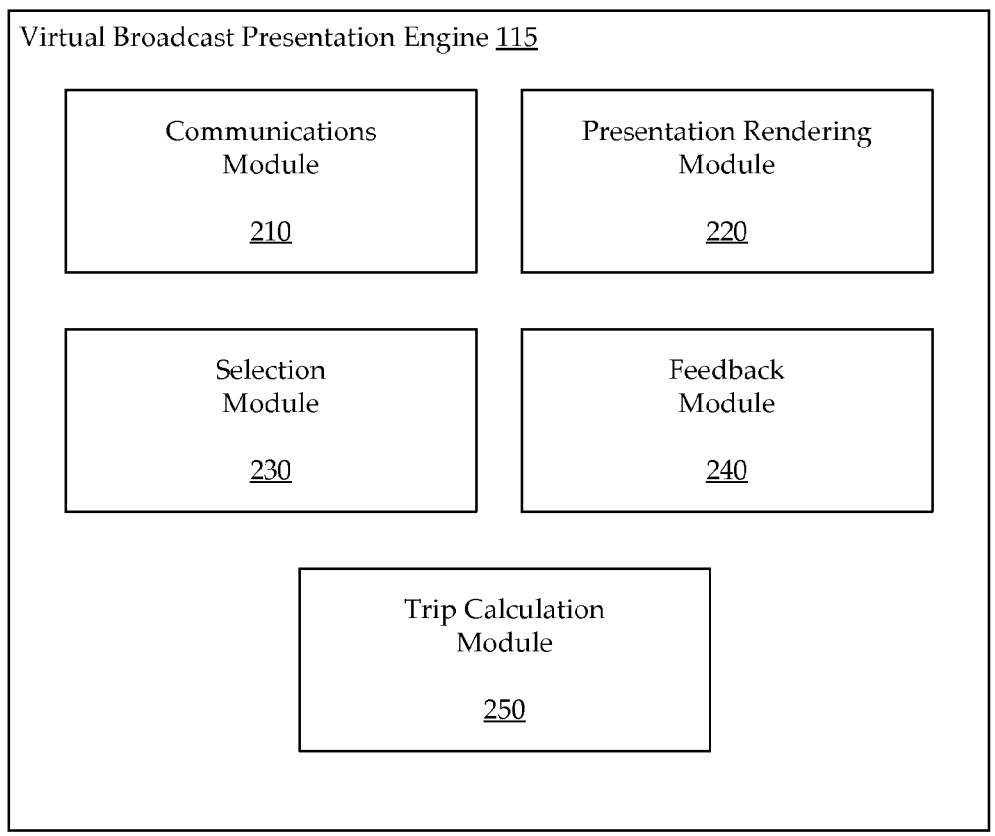
FIG. 2 illustrates the virtual broadcast presentation engine of FIG. 1.

FIG. 2 illustrates the virtual broadcast presentation engine of FIG. 1. The virtual broadcast presentation engine 115 of FIG. 2 includes a communications module 210, a presentation rendering module 220, a selection module 230, a feedback module 240, and a trip calculation module 250. The virtual broadcast presentation engine 115 and its constituent modules may be stored in memory and executed by a processing device to effectuate the functionality corresponding thereto. The virtual broadcast presentation engine 115 may be composed of more or less modules (or combinations of the same) and still fall within the scope of the present invention. For example, the functionality of the selection module 230 and the functionality of the feedback module 240 may be combined into a single module.

Execution of the communications module 210 allows for receipt of a gesture detected or captured by a sensor or camera of the computing device 110. Execution of the communications module 210 may also allow for a user selection such as the selection by a presenter of an interactive element displayed within the virtual broadcast presentation. Execution of the communications module 210 may additionally allow for a user selection of other components included within the virtual broadcast presentation such as various soft keys with different functionalities. Execution of the communications module 210 may also allow for receipt of dynamic information from the information sources 130. This dynamic information may be used by other modules for generating, manipulating, and interacting with the virtual broadcast presentation.

Referring again to FIG. 2, execution of the presentation rendering module 220 allows for the generation of a virtual broadcast presentation based on the dynamic information received through execution of the communications module 210. The dynamic information may include traffic information, weather information, newsworthy events or incidents, election results, school closings, or other information that may be featured in a virtual broadcast presentation.

Execution of the presentation rendering module 220 may also allow for manipulation of a view of the virtual broadcast presentation in response to the gesture received by the communications module 210. Manipulating the view of the presentation may include one or more of panning across, rotating, tilting, or zooming in/out of the virtual broadcast presentation. A gesture associated with a particular input command may be assigned to a specific manipulation of the virtual broadcast presentation. For example, a gesture of waving a hand from left to right may adjust the view to pan across the map or presentation. As another example, a gesture corresponding to the interaction technique of "pinching" may be associated with an input command to zoom in/out of a current viewpoint of a presentation. A presenter may manipulate the presentation by gesturing and either spreading two fingers apart or bringing two fingers close together. As another example, a gesture may be associated with an input command to select a soft key displayed within the virtual broadcast presentation. Selection of one soft key, for example, may affect zoom speed, while selection of a different soft key may affect zoom direction.

Execution of the selection module 230 allows for selection of an interactive element included in the virtual broadcast presentation in response to the received gesture. A gesture may be associated with an input command to select an interactive element displayed within the virtual broadcast presentation. An interactive element may include a soft key displayed within the virtual broadcast presentation. The interactive element may also represent a traffic alert. For example, if road construction is taking place at a given intersection of two streets, an icon indicative of road construction may be placed in the virtual broadcast presentation at a position that corresponds to that given intersection. Execution of the selection module 230 may also select the interactive element when the interactive element is positioned near the center of the virtual broadcast presentation.

Selecting an interactive element may cause one of a variety of responses from the virtual broadcast presentation. For example, selection of the interactive element may cause additional information related to the interactive element to be displayed within the virtual broadcast presentation. In one embodiment, the interactive element may correspond to a traffic camera wherein selection of the interactive element causes a live camera view to appear within the virtual broadcast presentation.

Execution of the feedback module 240 provides feedback to the presenter to inform the presenter that a given interactive element is selectable. For example, the interactive element may be selectable in certain regions of the virtual broadcast presentation, such as the center. When the interactive element enters or leaves the center of the virtual broadcast presentation, the presenter may be informed via feedback. The feedback may include highlighting of the interactive element. To avoid distracting or otherwise undesirable imagery such as a cursor being included in the virtual broadcast presentation, non-visible feedback, such as an audible tone, may be invoked. The interactive element may also be selectable by gesturing to hover a pointer on the virtual broadcast presentation, and by applying gesture of selection when the location of the pointer coincides with that of the interactive element.

Execution of the feedback module 240 also provides feedback to the presenter that a given interactive element has been successfully selected. For example, if the presenter has selected a particular interactive element, the feedback module 240 may highlight the interactive element, change the color or appearance of the interactive element, or cause the interactive element to blink or flash continually. Such feedback confirms the selection of the interactive element and prevents the presenter from selecting the same interactive element multiple times.

Execution of the trip calculation module 250 may allow for the determination or calculation of an estimated amount of time (e.g., 'trip time') needed to travel from a selected location to another location. In one embodiment, the presenter may select a first interactive element displayed in the virtual broadcast presentation wherein the first interactive element corresponds to a starting point or location. The presenter may then select a second interactive element displayed in the presentation that corresponds to a desired end point or destination location. An interactive element or starting/end point may include a particular street, road, landmark or point of interest, highway, neighborhood, town, city, area, region or the like. The trip calculation module 250 may calculate or forecast the estimated amount of time required to traverse the real world distance from the first selected interactive element to the second interactive element in real-time considering, at least in part, information from the information sources 130. When calculating a trip time, the trip calculation module 250, for example, may consider the actual distance from the starting point to the end point, as well as various conditions affecting travel, including current weather conditions or traffic conditions such as a recent accident or road closure. In another embodiment, trip calculation module 250 may be used to calculate an estimated travel distance between two selected locations. Execution of trip calculation module 250 may occur following the selection of a 'mode key' as discussed further in FIG. 3A below.

Execution of the virtual broadcast presentation engine 115 may output the virtual broadcast presentation to other components of the computing device 110 for generation of the composite presentation. Accordingly, the computing device 110 may output the composite presentation to the broadcast system 150 for dissemination to viewers.

Figure 3A:
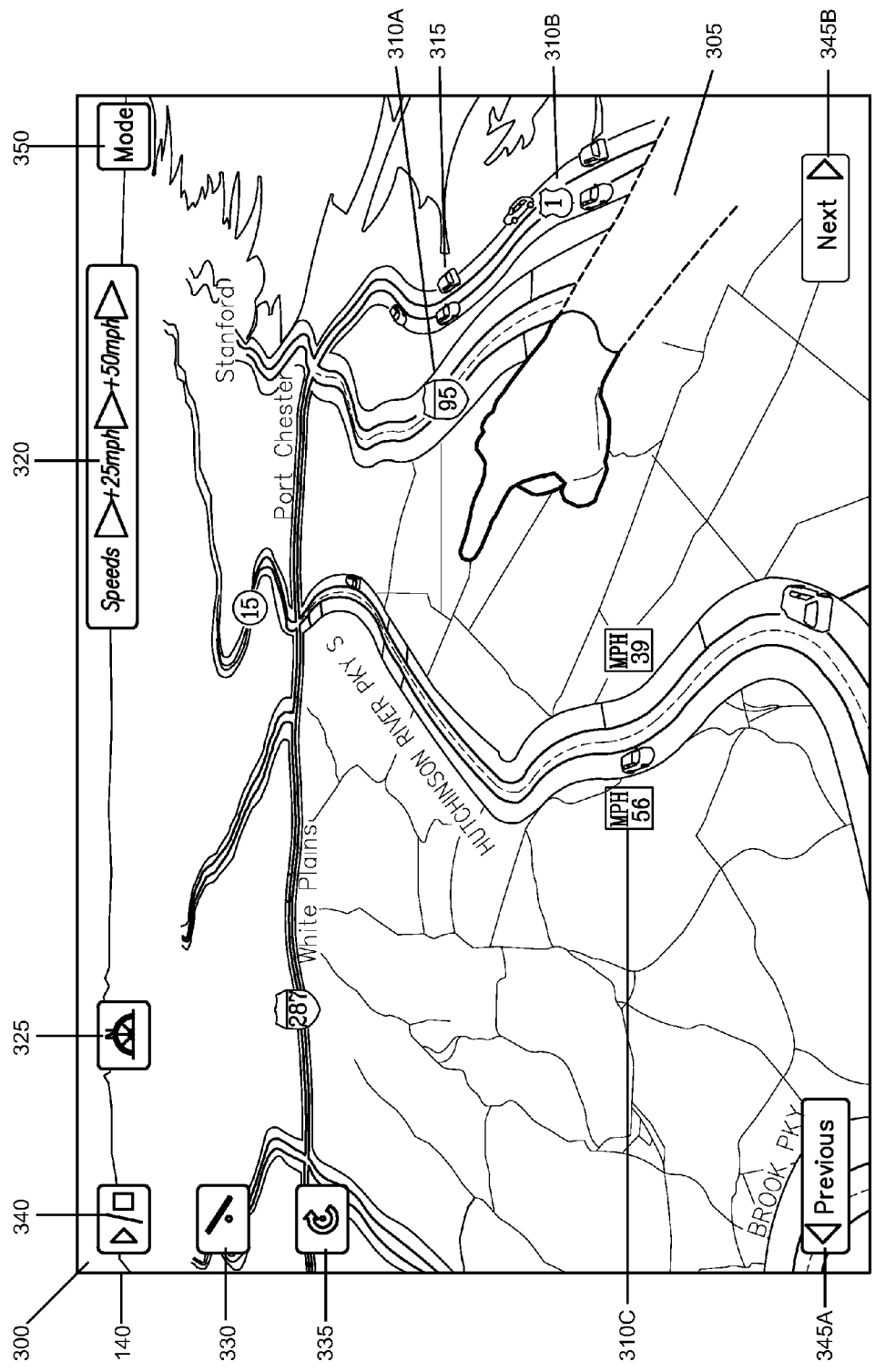
FIGS. 3A-3B illustrate a virtual broadcast presentation displayed on a display screen.

FIG. 3A illustrates a virtual broadcast presentation 300 displayed on a display screen 140. The presentation 300 of FIG. 3A includes traffic information. The principles described herein with respect to traffic are equally applicable to embodiments of the present invention that include weather information, newsworthy events or incidents, school closings, election results, or other information that may be featured in a virtual broadcast presentation. Presentation 300 may be generated and manipulated by execution of the presentation rendering module 220 in real-time. Presentation 300 may include satellite images of a given area with an animated road traffic report. A detailed description of animated road traffic reports may be found in U.S. patent application Ser. No. 11/302,418, now U.S. Pat. No. 7,221,287, the disclosure of which is incorporated by reference.

Satellite images may be manipulated by execution of the presentation rendering module 220 to aid in generating three-dimensional information. For example, two-dimensional satellite images may be processed in the context of other geographical information (e.g., topographical information) to generate a three-dimensional satellite image that reflects information along an x-, y-, and z-axis as illustrated in presentation 300. The textured three-dimensional representation of landscape of a particular urban area aligns with and provides the three-dimensional coordinates for the roadways that may be animated and overlaid on the satellite images.

The presentation 300 may also include a variety of markers (310A-310 C) to identify or label various locations, landmarks, or points of interest appearing in the presentation 300 such as exit ramps, highways, named sections of highways, or city streets. These markers may be readily or universally recognizable, such as a highway marker resembling a California state highway sign with the appropriate highway number. The presentation 300 may also include markers or icons corresponding to the location of traffic incidents, road construction, and traffic cameras. Some or all of these markers 310C may be interactive elements of the virtual broadcast presentation 300 and show real-time conditions, such as an average traffic speed associated with a particular location. An interactive element may include any marker, icon, label, object, or image appearing in the presentation 300 that may be associated with real-time content or data. An interactive element, for example, may include a street, road, bridge, highway, landmark, point of interest, traffic incident or alert, road construction, or traffic camera.

Figure 4:
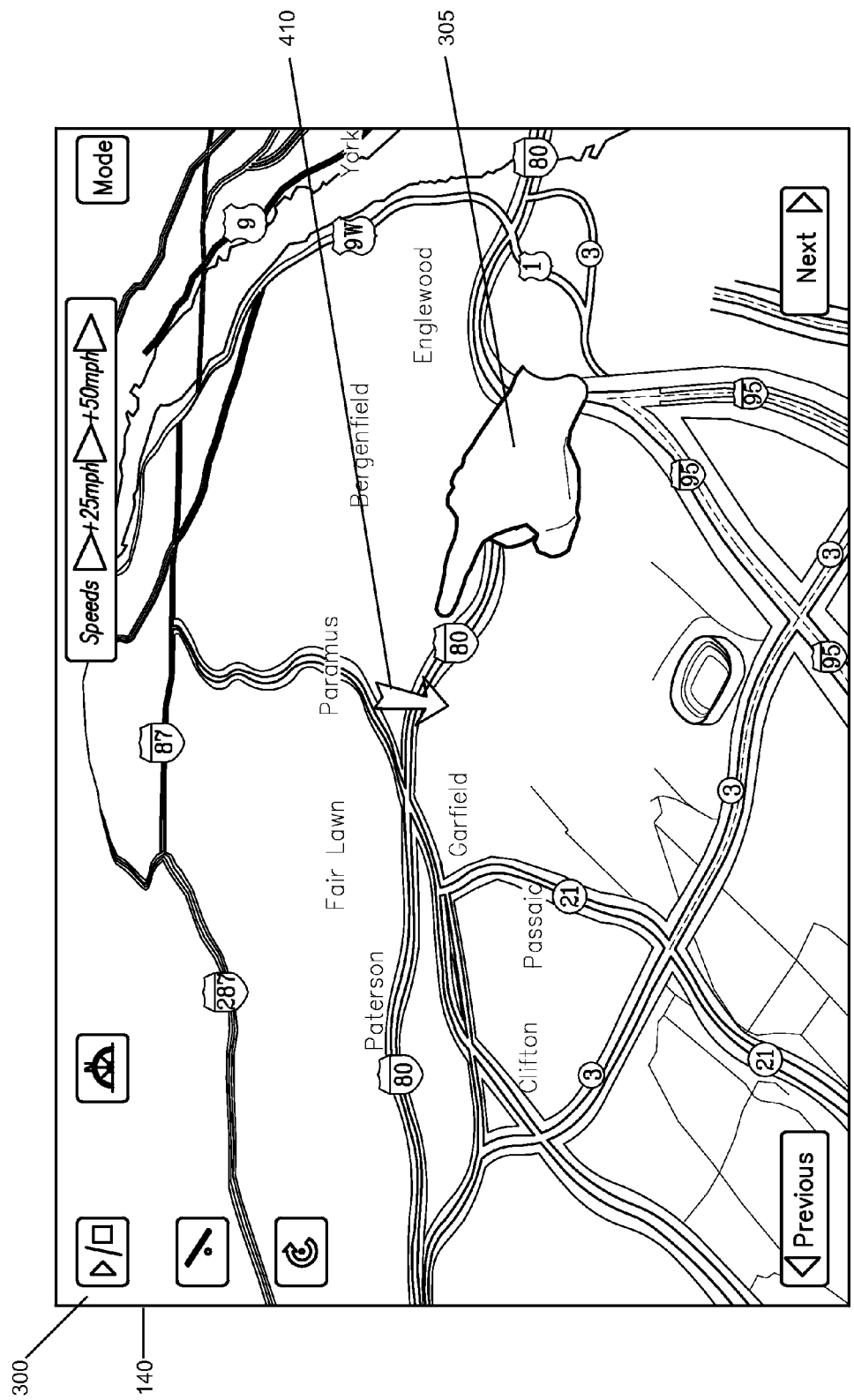
FIG. 4 illustrates an interactive element appearing in a virtual broadcast presentation.

FIG. 4 illustrates an interactive element appearing in a virtual broadcast presentation 300 displayed on display screen 140. A presenter 305 may select an interactive element using a gesture. Any gesture corresponding to an input command for selection of an interactive element may be used. Pointing to an interactive element with one hand, for example, may select of the interactive element. In one embodiment, an interactive element 410 (i.e., traffic incident) may be marked by a particular icon, image, or symbol (e.g., an arrow pointing to the location of the traffic incident), as shown in FIG. 4. When an interactive element is selected, additional information related to that interactive element may be displayed. In one embodiment, an interactive element marking a traffic incident may be selected resulting in detailed textual information describing the traffic incident being displayed within the presentation 300 (not shown).

Returning to FIG. 3A, presentation 300 may include images of vehicles 315 appearing along a specific roadway or highway. A vehicle 315 may be animated, for example, to show the speed and direction of traffic along a particular highway. The presentation 300 may also use color coding to demonstrate real-time traffic conditions. Color coding may help a viewer of the presentation 300 to quickly understand real-time traffic conditions associated with a depicted map or location. The presentation 300 may include a legend 320 describing various objects or color representations used in the presentation 300. A 'green' colored section of a road, street, or highway, for example, may represent that real-time traffic is moving at a speed of 50 miles per hour or higher (e.g., normal or optimal conditions). A 'yellow' colored highway may represent traffic speeds of 25 miles per hour or higher (e.g., delayed conditions), while a 'red' colored highway may represent traffic speeds that are less than 25 miles per hour (e.g., slow or impacted conditions).

In one embodiment, the presentation 300 may display one or more soft keys with various functionalities such as orientation key 325, tilt key 330, rotation key 335, synchronization key 340, previous and next presentation display keys 345A-345B, and mode key 350. In another embodiment, soft keys may be absent from the presentation 300 where the functionality of a soft key is activated by a specific gesture alone.

The presenter 305 may select a soft key or activate the functionality of a soft key to facilitate or enhance the understanding of the content of presentation 300. For example, the presenter 305 may use the tilt key 330 to adjust or modify a view or perspective of the presentation 300 vertically or horizontally. The presenter 305 may also change the perspective of the presentation 300 by selecting the rotation key 335. Changing the perspective of the presentation 300 may alter the orientation of the presentation such that a 'north' direction of a map or image is not oriented at the top of the display screen 140. As such, the presenter 305 may select the orientation key 325 to return the 'north' direction to the top of the display screen 140. In one embodiment, the presenter 305 may select a soft key (e.g., tilt key 330 or rotation key 335) with one gesture (i.e., using one hand) while using another gesture (i.e., the other hand) to activate the functionality of the soft key (e.g., move or adjust the presentation 300 in the desired direction).

The presentation 300 may also include a synchronization key 340. The presentation 300 may be generated based on information received in real-time or near real-time through execution of the communications module 210. The presenter 305 may select the synchronization key 340 to cause the synchronization of data in real time such that the presentation 300 reflects the most current information and conditions. In one embodiment, synchronization of data may be done automatically. In another embodiment, the presenter 305 or another user may program or instruct the computing device 110 to synchronize data at regular time periods (e.g., every 10 seconds, every minute, every two minutes, etc.).

A presenter 305 may zoom in or out of the presentation 300 by selecting keys corresponding to a particular view of the presentation such as a previous key 345A and a next key 345B. For example, a previous key 345A may revert to a presentation that offers a zoom out view while a next key 345B may allow a view that zooms in from the current view. The previous and next keys may, alternatively, be assigned zoom in or zoom out functionality. A presenter 305 may select a particular key (345A, 345B) multiple times to further zoom in or out of the current view. In one embodiment, the keys (345A, 345B) may be used to display or shift to a different image or map within the presentation 300.

The presentation 300 may also include a mode key 350. A presenter 305 may operate the presentation 300 in different modes such as 'trip time mode' or 'navigation mode.' A presenter 305 may switch between various modes by selecting the mode key 350. A presenter 305 may use 'navigation mode' to view the presentation 300 as described in FIG. 3B below. 'Trip time mode' is discussed in further detail in FIGS. 5A and 5B below.

Figure 3B:
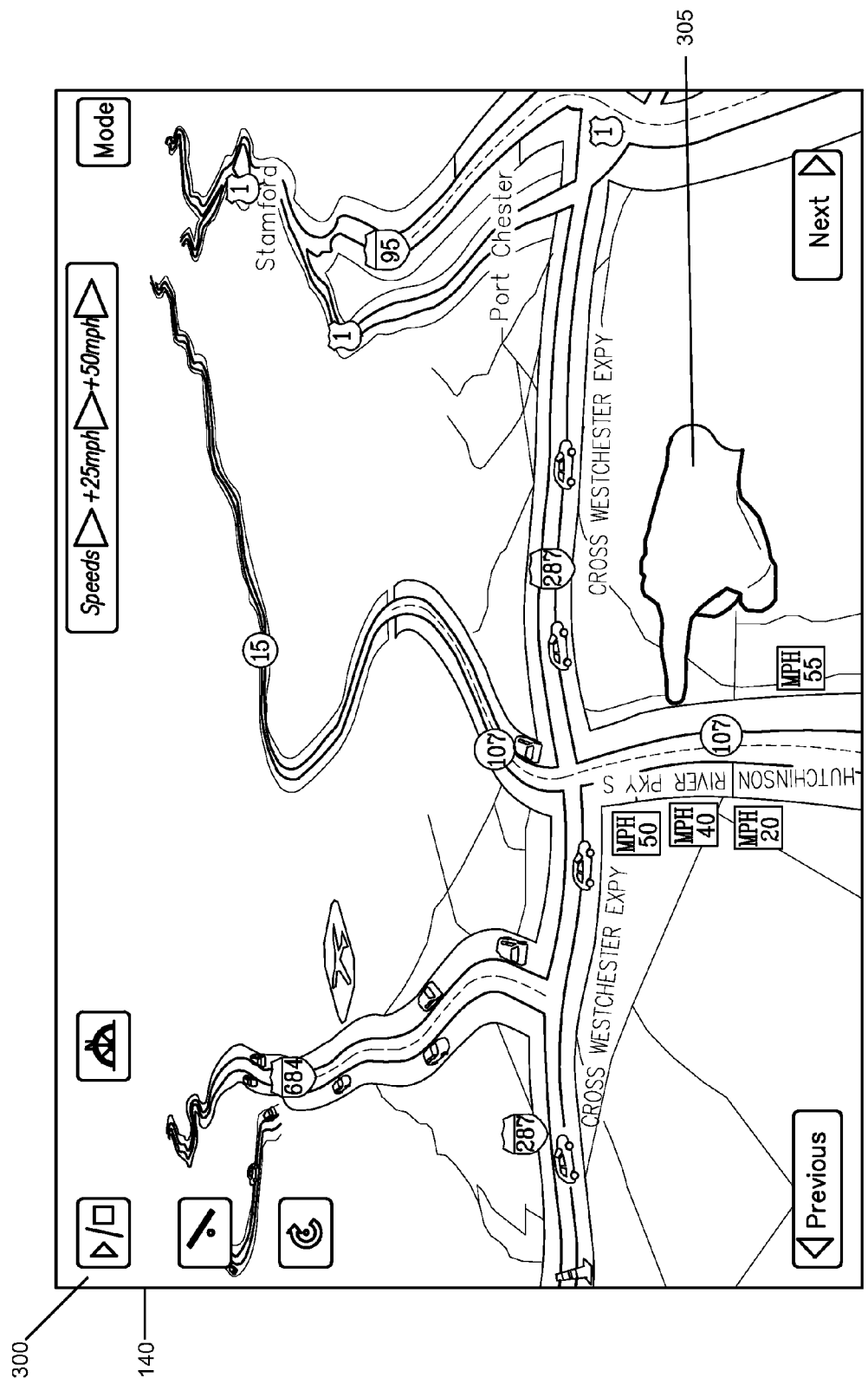

FIG. 3B illustrates the virtual broadcast presentation 300 of FIG. 3A following manipulation by the presenter 305. The presenter 305 may manipulate the presentation 300 in 'navigation mode' to review or illustrate real-time traffic conditions (e.g., average traffic speeds, traffic incidents, etc.) associated with various locations depicted in the presentation 300. A view of the presentation 300 may be manipulated to give the effect of 'flying' or scrolling through the three-dimensional virtual representation of the traffic map and images. As the presenter 305 scrolls through the presentation 300, various interactive elements may be highlighted and/or become available for selection. FIG. 3B illustrates the presentation 300 of FIG. 3A following the presenter 305 making a gesture that is associated with an input command to scroll through the presentation 300. As a result, the presentation 300 (as shown in FIG. 3B) shows a different portion of the presentation 300 (i.e., the intersection of highways 287 and 107) and the associated traffic conditions (e.g., traffic speeds).

The presenter 305 may also manipulate the presentation 300 by panning, tilting, and/or rotating the view. For example, as the presenter 305 makes a gesture corresponding to an input command to scroll through the presentation 300, the communications module 210 detects the gestures in conjunction with execution of the computing device 110 which processes the detected gesture. In turn, the presentation rendering module 220 may be executed to move or rotate the presentation 300 a corresponding amount or in proportion to the gesture of the presenter 305. The correspondence of the presentation 300 to the gesture of the presenter 305 gives the presenter 305 the sensation of directly controlling the presentation 300. Such manipulation of the view may also be used in selecting interactive elements. For example, if a particular interactive element may be selected only when near the center of the presentation 300, the presenter 305 may cause the view to be manipulated such that the particular interactive element is centered and therefore selectable.

Figure 5A:
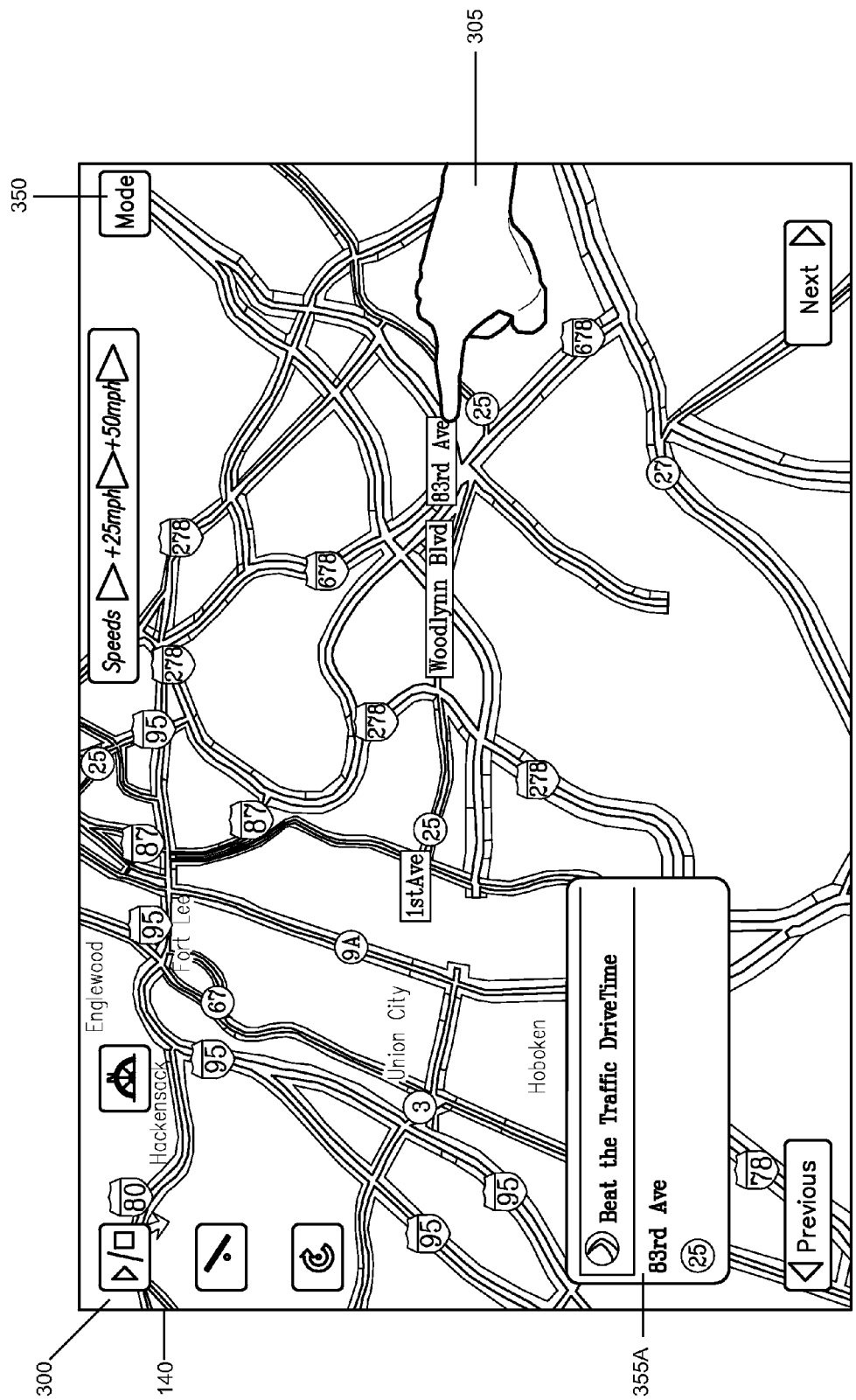
FIGS. 5A-5B illustrate a virtual broadcast presentation in 'trip time' mode.
Figure 5B:
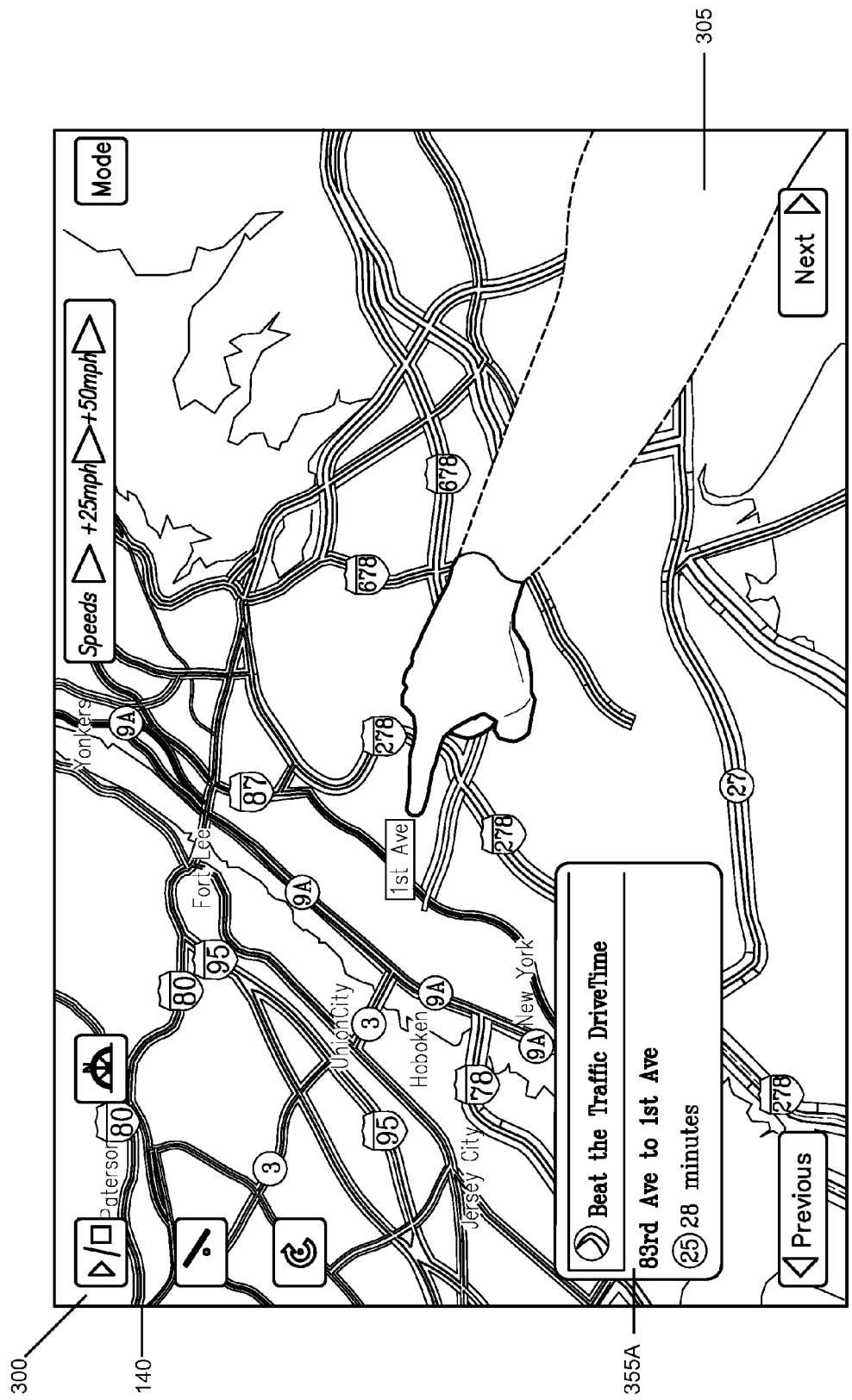

FIGS. 5A-5B illustrate a virtual broadcast presentation in 'trip time mode.' The presenter 305 may activate trip time mode by making a gesture associated with an input command to activate trip time mode. In another embodiment, the presenter 305 may make a gesture to select the mode key 350 to activate trip time mode. Once trip time mode has been activated, the presenter 305 may make a gesture associated with an input command to select an interactive element corresponding to a first location or starting point displayed within the virtual broadcast presentation 300 on the display screen 140. As shown in FIG. 5A, the presenter 305 has selected or designated "83$^{rd}$ Ave" as a starting point. Following selection of the first location, a display 355A may appear confirming the selection of the presenter 305.

The presenter 305 may then select another interactive element corresponding to a second location or end point or travel destination by making a gesture associated with an input command to select a second interactive element within the presentation 300. As shown in FIG. 5B, the presenter 305 has selected or designated "1$^{st}$ Ave" as an end point. Following selection of the second interactive element, the trip calculation module 250 may calculate the estimated amount of time required to traverse the real world distance from the first selected interactive element (i.e., "83$^{rd}$ Ave") to the second interactive element (i.e., "1$^{st}$ Ave") in real-time considering, at least in part, information from information sources 130. The trip calculation module 250 may consider various conditions affecting travel such as weather conditions or traffic conditions such as a recent accident, a road closure, special events (e.g., holidays, sporting events, festivals, concerts, graduations, etc.) or any other delay. A display 355B may then show the estimated trip time (i.e., "28 minutes"), as well as any condition affecting travel within presentation 300 on the display screen 140. The display 355B may also show the route (i.e., highway "25") associated with the calculated trip time.

Besides calculating the estimate trip time in real-time, the trip time module 250 may calculate or forecast the estimated trip time based on a time of day and/or date (i.e., special day or occasion) designated by presenter 305. For example, presenter 305 may want to determine the estimated trip time at 9:00 AM (e.g., morning rush hour) or at 8:00 PM (e.g., a later evening hour). As another example, presenter 305 may want to determine the estimated trip time when departing at a particular time on the Labor Day holiday or on a date when a sporting event, concert, or other large gathering is scheduled at a venue. In trip time mode, the presenter 305 may input the desired time of day and/or date and select a starting point and end point for trip time calculation. In another embodiment, trip time mode may also be used to calculate an estimated travel distance between two selected locations (not shown). The calculated estimated travel distance may also be displayed within presentation 300.

Figure 6A:
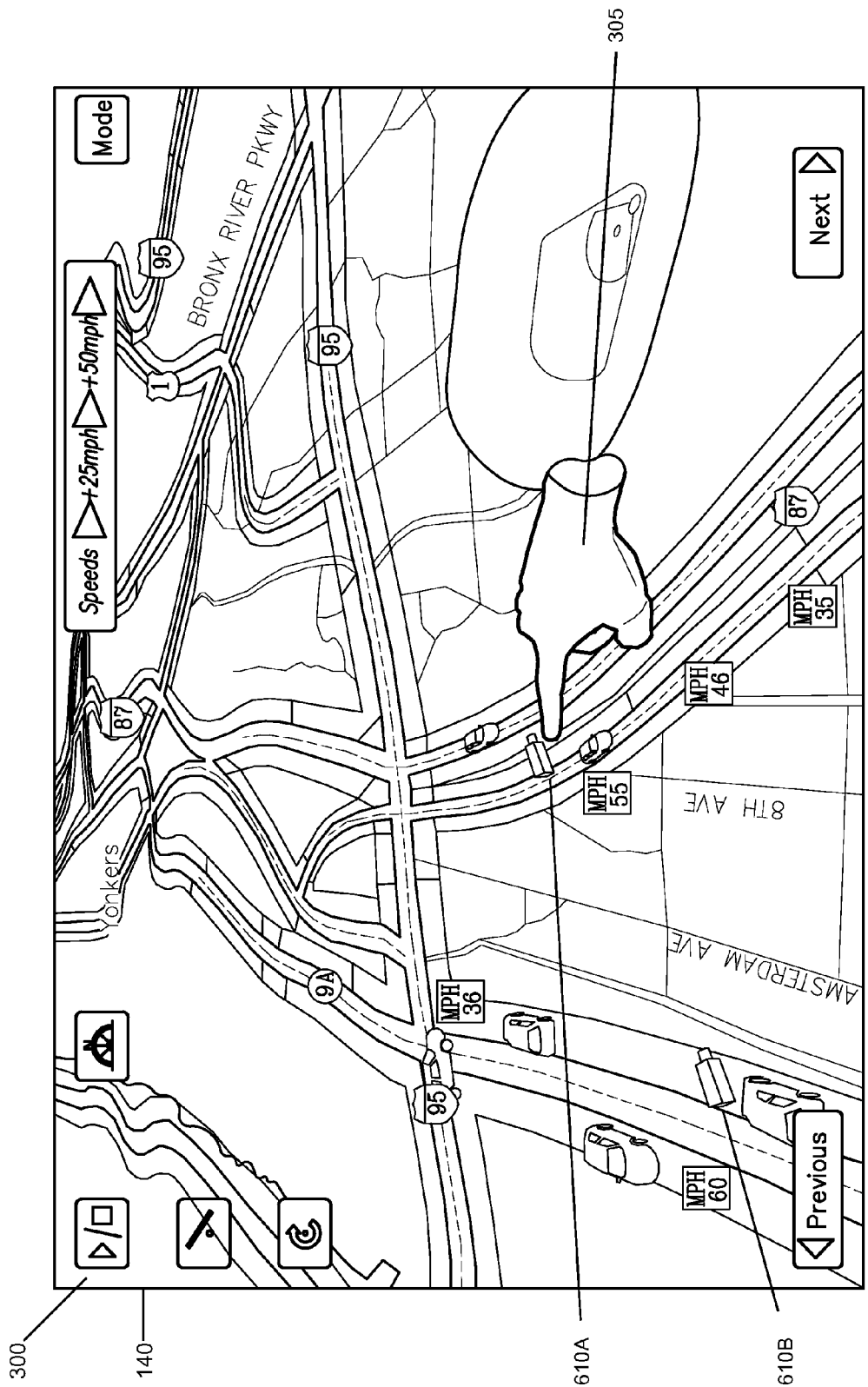
FIGS. 6A-6B illustrate a traffic camera appearing within a virtual broadcast presentation.
Figure 6B:
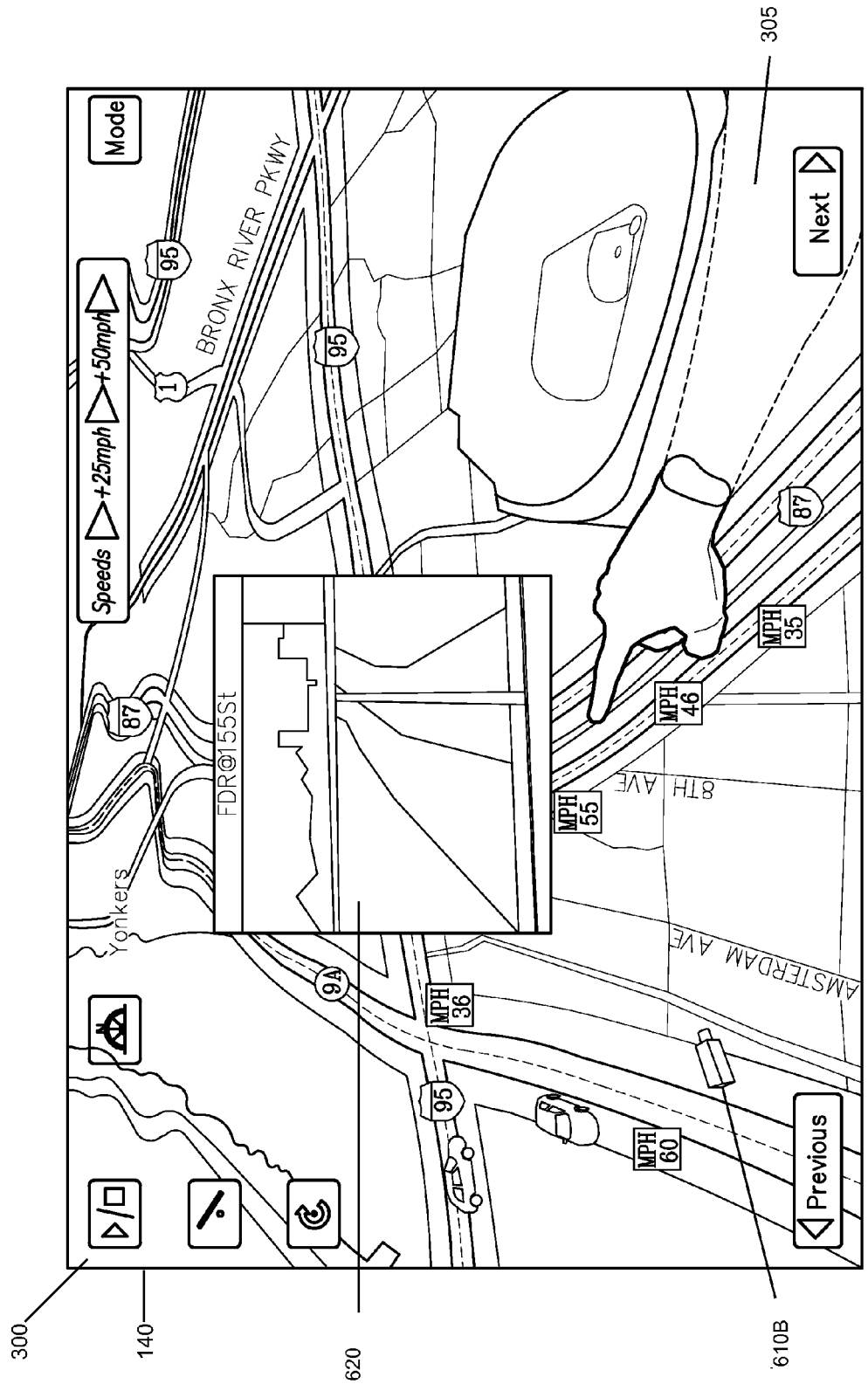

FIGS. 6A-6B illustrate a traffic camera appearing within the virtual broadcast presentation 300 displayed on the display screen 140. In one embodiment, an interactive element appearing in the presentation 300 may include a traffic camera (610A, 610B). The presenter 305 may select a traffic camera 610A by making a gesture associated with an input command to select the traffic camera 610A (as shown in FIG. 6A). Following selection of a traffic camera 610A associated with a particular location, a live video feed 620 corresponding to the location of a real-world traffic camera may be displayed within the presentation 300 (as shown in FIG. 6B). The presenter 305 may then use the live video 620 feed to view actual traffic conditions associated with the real world location of traffic camera 610A.

Figure 7:
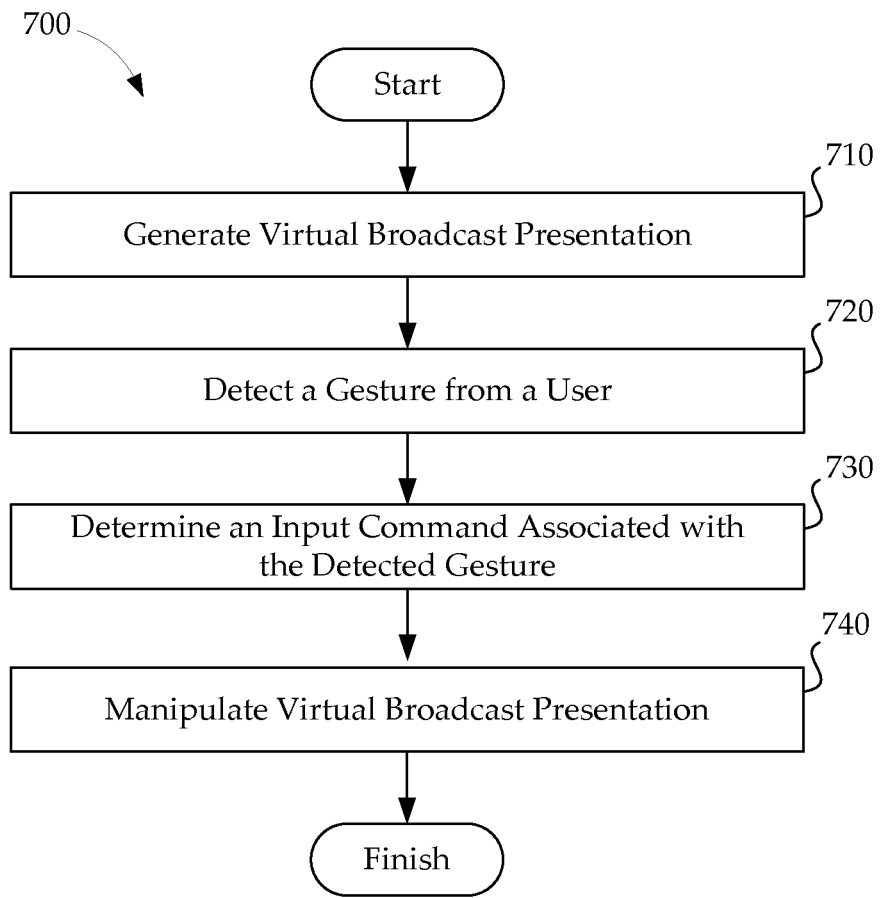
FIG. 7 is a flowchart illustrating a method for gesture based interaction with traffic data presented in a virtual broadcast presentation.

FIG. 7 is a flow chart illustrating a method 700 for gesture based interaction with traffic data presented in a virtual broadcast presentation. The steps of method 700 may be performed in varying orders. Steps may be added or subtracted from the method 700 and still fall within the scope of the present invention. The steps of the process of FIG. 7 may be embodied in hardware or software including a non-transitory computer-readable storage medium comprising instructions executable by a processor of a computing device.

At step 710, a real-time, virtual broadcast presentation 300 is generated. The presentation 300 may be based on dynamic information and may be two-dimensional or three-dimensional. Execution of the presentation rendering module 210 may perform step 710. The dynamic information may include real-time traffic information or real-time weather information and be received from the information sources 130 in conjunction with execution of the communications module 210.

At step 720, a gesture made by a user may be detected by a sensor or camera of the computing device 110. The gesture may be associated with an input command for directing the computing device 110 to perform a particular action. For example, computing device 110 may cause the selection of an interactive element displayed within presentation 300 or manipulation of a view of the presentation 300. Step 720 may be performed by execution of the communications module 210. Detection of the gesture at step 720 allows for processing of the gesture at step 730.

At step 730, information related to the detected gesture is processed. Execution of the gesture recognition module 220 may perform step 730. The gesture recognition module 220 may process, recognize, and/or interpret a gesture and determine whether the gesture is associated with a known input command stored in database 125.

At step 740, the presentation 300 is manipulated based on the input command identified at step 730. Execution of the presentation rendering module 220 may perform step 740. The presentation 300 may be processed, for example, to allow for real-time manipulation of the presentation 300 and various views thereof such as zooming in and out, scrolling, panning across, tilting, or rotating. The presentation 300 may also be manipulated based on a gesture associated with an input command for selection of a soft key or selection of a particular mode, such as navigation mode, or trip time mode, displayed within the presentation 300. The presentation 300 may also be manipulated based on a gesture associated with an input command for the display of information associated with an interactive element selected by the presenter 305, such as information regarding a traffic incident, road closure, or average travel speeds.

Any number of additional and/or optional steps that are not otherwise depicted may be included in method 700. These steps may include selection of an interactive element included in the virtual broadcast presentation or feedback being provided to the presenter to inform the presenter that an interactive element is selectable.

It is noteworthy that any hardware platform suitable for performing the processing described herein is suitable for use with the invention. Computer-readable storage media refer to any medium or media that participate in providing instructions to a central processing unit (CPU) for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, or any other memory chip or cartridge.

Various forms of transmission media may be involved in carrying one or more sequences of one or more instructions to a CPU for execution. A bus may carry data to system RAM, from which a CPU retrieves and executes the instructions. The instructions received by system RAM may optionally be stored on a fixed disk either before or after execution by a CPU.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for gesture based interaction with dynamic traffic data, the method comprising:
   generating a real time virtual broadcast presentation based on dynamic traffic data received from one or more information sources in real time; and
   executing instructions stored in memory, wherein execution of the instructions by a processor:
      processes information related to a first gesture performed by a user interacting with the virtual broadcast presentation, the first gesture detected by a sensor coupled to a computing device, wherein the first gesture is associated with a first input command that selects a soft key displayed within the virtual broadcast presentation, and wherein the first gesture is a movement of a first hand performed by the user in front of the sensor without touching the sensor or the computing device;
      processes information related to a second gesture performed by the user, the second gesture detected by the sensor during detection of the first gesture, wherein the second gesture is associated with a second input command that modifies a view of the virtual broadcast presentation by performing a functionality associated with the selected soft key, and wherein the second gesture is a movement of a second hand performed by the user in front of the sensor without touching the sensor or the computing device;
      determines the first and second input commands associated with the detected first and second gestures by comparing each of the detected first and second gestures to a plurality of previously identified gestures stored in a database, wherein the database is customizable by the user; and
      manipulates the real time virtual broadcast presentation based on the first and second input commands.

2. The method of claim 1, wherein generating the real time virtual broadcast presentation is further based on dynamic weather data received from one or more information sources.

3. The method of claim 1, wherein the real time virtual broadcast presentation is three-dimensional.

4. The method of claim 1, wherein further execution of the instructions processes information related to a third gesture performed by the user, the third gesture detected by a sensor coupled to the computing device, wherein the third gesture is associated with a third input command.

5. The method of claim 4, wherein the third input command selects an interactive element displayed within the virtual broadcast presentation.

6. The method of claim 5, wherein the interactive element is a traffic alert.

7. The method of claim 5, wherein the interactive element is a live camera showing a real time traffic condition associated with a real world location of the live camera.

8. The method of claim 4, wherein the third input command includes calculating an estimated travel time between two user selected locations, the two user selected locations being interactive elements displayed within the real time virtual broadcast presentation, and wherein the first selected location corresponds to a first location designated as a starting point and the second selected location corresponds to a second location designated as an end point.

9. The method of claim 8, wherein calculating the estimated travel time is based on a designated time of day.

10. The method of claim 4, wherein the third input command includes calculating an estimated travel distance between two user selected locations, the two user selected locations being interactive elements displayed within the real time virtual broadcast presentation, and wherein the first selected location corresponds to a first location designated as a starting point and the second selected location corresponds to a second location designated as an end point.

11. The method of claim 1, wherein manipulating the real time virtual broadcast presentation includes rotating or tilting a view of the real time virtual broadcast presentation.

12. The method of claim 1, wherein manipulating the real time virtual broadcast presentation includes zooming in or zooming out of the real time virtual broadcast presentation.

13. The method of claim 1, wherein manipulating the real time virtual broadcast presentation includes scrolling through the real time virtual broadcast presentation.

14. The method of claim 1, wherein manipulating the real time virtual broadcast presentation includes displaying information regarding a user selected interactive element included in the real time virtual broadcast presentation.

15. A system for gesture based interaction with dynamic traffic data, the system comprising:
- a processor; and
- memory that stores instructions executable by the processor to:
  - detect a first gesture performed by a user interacting with a real time virtual broadcast presentation, the first gesture detected by a sensor coupled to the processor, wherein the first gesture is associated with a first input command that selects a soft key displayed within the virtual broadcast presentation, and wherein the first gesture is a movement of a first hand performed by the user in front of the sensor without touching the sensor;
  - detect a second gesture performed by the user, the second gesture detected by the sensor during detection of the first gesture, wherein the second gesture is associated with a second input command that modifies a view of the virtual broadcast presentation by performing a functionality associated with the selected soft key, and wherein the second gesture is a movement of a second hand performed by the user in front of the sensor without touching the sensor;
  - determine the first and second input commands associated with the detected first and second gestures by comparing each of the detected first and second gestures to a plurality of previously identified gestures stored in a database, wherein the database is customizable by the user;
  - generate the real time virtual broadcast presentation based on dynamic traffic data received from one or more information sources in real time; and
  - manipulate the real time virtual broadcast presentation based on the first and second input commands.

16. The system of claim 15, wherein further execution of the instructions processes information related to a third gesture performed by the user, the third gesture detected by a sensor coupled to the processor, wherein the third gesture is associated with a third input command, and the third input command selects an interactive element included in the real time virtual broadcast presentation.

17. The system of claim 16, further comprising instructions executable by the processor to inform the user that the interactive element is selectable.

18. The system of claim 15, further comprising instructions executable by the processor to determine an estimated travel time or travel distance between two user selected locations.

19. A non-transitory computer readable storage medium having a program embodied thereon, the program executable by a processor to perform a method for gesture based interaction with dynamic traffic data, the method comprising:
- generating a real time virtual broadcast presentation based on dynamic traffic data received from one or more information sources in real time;
- processing information related to a first gesture performed by a user interacting with the virtual broadcast presentation, the first gesture detected by a sensor coupled to a computing device, wherein the first gesture is associated with a first input command that selects a soft key displayed within the virtual broadcast presentation, and wherein the first gesture is a movement of a first hand performed by the user in front of the sensor without touching the sensor or the computing device;
- processing information related to a second gesture performed by the user, the second gesture detected by the sensor during detection of the first gesture, wherein the second gesture is associated with a second input command that modifies a view of the virtual broadcast presentation by performing a functionality associated with the selected soft key, and wherein the second gesture is a movement of a second hand performed by the user in front of the sensor without touching the sensor or the computing device;
- determining the first and second input commands associated with the detected first and second by comparing each of the detected first and second gestures to a plurality of previously identified gestures stored in a database, wherein the database is customizable by the user; and
- manipulating the real time virtual broadcast presentation based on the first and second input commands.

* * * * *